(12) United States Patent
Podrazhansky et al.

(10) Patent No.: US 6,232,750 B1
(45) Date of Patent: May 15, 2001

(54) BATTERY CHARGER WITH ENHANCED CHARGING AND CHARGE MEASUREMENT PROCESSES

(75) Inventors: Yury Podrazhansky, Norcross; Richard C. Cope, Duluth; Mikhail Y. Podrazhansky, Norcross, all of GA (US)

(73) Assignee: Enrey Corporation, Norcross, GA (US)

( * ) Notice: Subject to any disclaimer, the term of this patent is extended or adjusted under 35 U.S.C. 154(b) by 0 days.

(21) Appl. No.: 09/487,693

(22) Filed: Jan. 19, 2000

Related U.S. Application Data

(60) Provisional application No. 60/138,413, filed on Jun. 8, 1999.

(51) Int. Cl.[7] .................................................. H02J 7/04
(52) U.S. Cl. ................................................... 320/139
(58) Field of Search .................................. 320/139, 141, 320/145

(56) References Cited

U.S. PATENT DOCUMENTS

| | | | |
|---|---|---|---|
| 3,816,807 | 6/1974 | Taylor ................................... | 320/139 |
| 3,857,087 | 12/1974 | Jones ..................................... | 320/130 |
| 3,987,353 | 10/1976 | Macharg .............................. | 320/161 |
| 4,577,144 | 3/1986 | Hodgman et al. .................... | 320/131 |
| 4,740,739 | 4/1988 | Quammen et al. ................... | 320/129 |
| 4,746,852 | 5/1988 | Martin .................................. | 320/106 |
| 4,852,540 | * 8/1989 | Safranek .............................. | 320/162 |
| 4,878,007 | 10/1989 | Gabor et al. .......................... | 320/136 |
| 5,200,689 | 4/1993 | Interiano et al. ..................... | 320/149 |
| 5,307,000 | * 4/1994 | Podrazhansky et al. ............. | 320/149 |
| 5,329,219 | 7/1994 | Garrett ................................. | 320/150 |

(List continued on next page.)

FOREIGN PATENT DOCUMENTS

97/32384    9/1997 (WO) .

OTHER PUBLICATIONS

Int'l Search Report, Sep. 20, 2000.

*Primary Examiner*—Peter S. Wong
*Assistant Examiner*—Pia Tibbits
(74) *Attorney, Agent, or Firm*—Troutman Sanders LLP; Charles L. Warner

(57) ABSTRACT

A battery is rapidly charged utilizing a bipolar waveform (21, 22). The voltage, current, duration and frequency parameters of the bipolar waveform are selected to perform a number of actions: enhancing the mixing action at the battery electrodes; measuring the battery's capacitance, condition, and level of impedance; modifying the mass transport process inside the battery; and reducing the concentration of the diffusion layer, the polarization concentration, and the overpotential. This reduces internal heat generation by providing for more efficient ion transport, reduced concentration gradients, and increased diffusion rates and intercalation speeds. A bipolar waveform can be in the form of sine waves, or other wave shapes. A charge pulse (11) is preferably followed by a small technical rest period (12), after which a discharge pulse (13) is applied followed, in turn, by a rest period (14). The bipolar waveform (21) is superimposed on one or more of the above. A second discharge pulse (15) is then applied followed by another rest period (16). A second bipolar waveform (22) is superimposed on either the second discharge pulse (15) or the second rest period (16). The second bipolar waveform (22) allows a measurement of the battery capacitance to be obtained and an evaluation of the charge of the battery to be derived. The charge cycle is repeated until a measured battery parameter attains a desired value indicative of a charged battery.

48 Claims, 14 Drawing Sheets

U.S. PATENT DOCUMENTS

| | | | |
|---|---|---|---|
| 5,331,268 | 7/1994 | Patino et al. | 320/158 |
| 5,481,174 | 1/1996 | Martin et al. | 320/129 |
| 5,525,892 | 6/1996 | Phommarath | 320/139 |
| 5,561,597 * | 10/1996 | Limpaecher | 320/166 |
| 5,760,568 * | 6/1998 | Naskali | 320/139 |
| 5,801,515 | 9/1998 | Chen et al. | 320/139 |
| 5,808,446 * | 9/1998 | Eguchi | 320/139 |
| 5,998,968 * | 12/1999 | Pittman et al. | 320/145 |

* cited by examiner

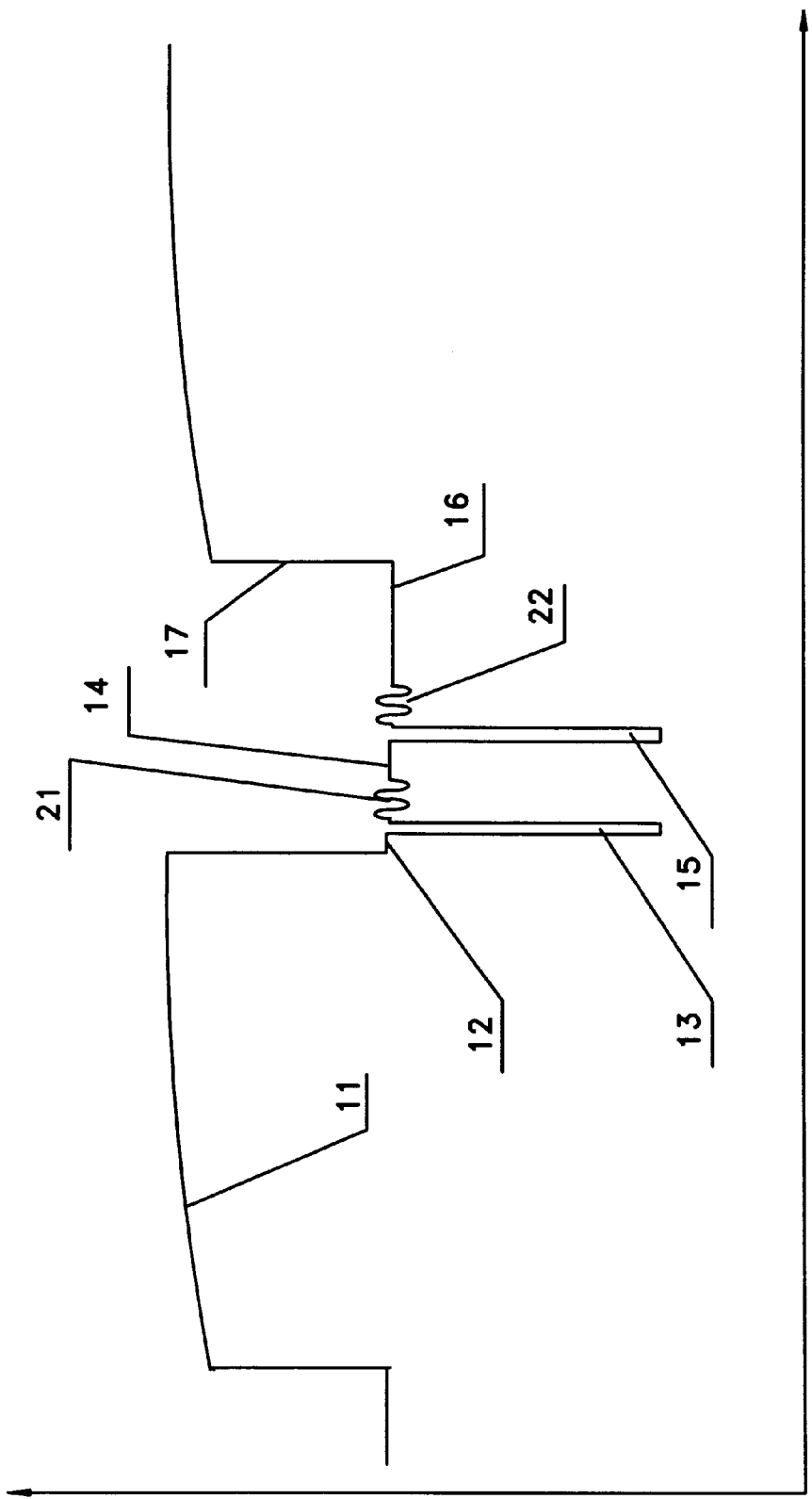

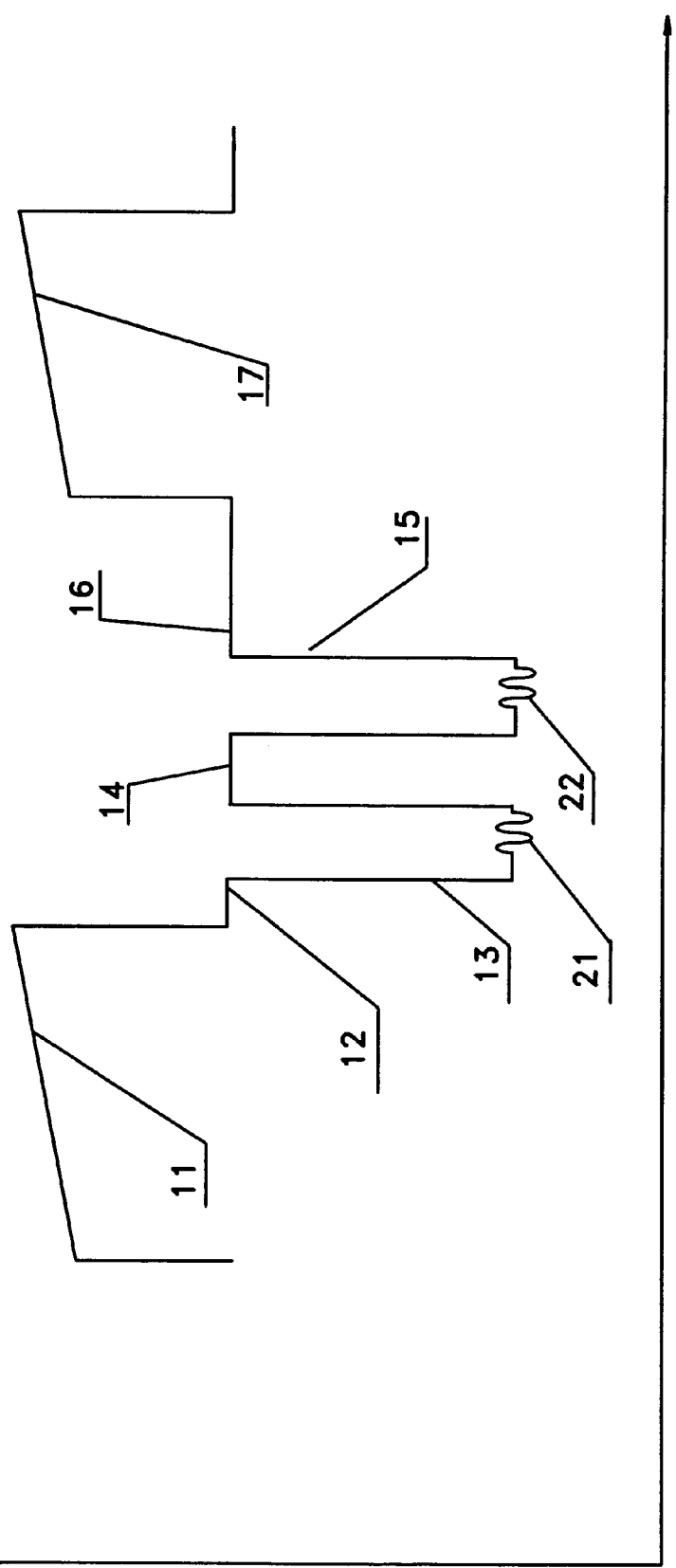

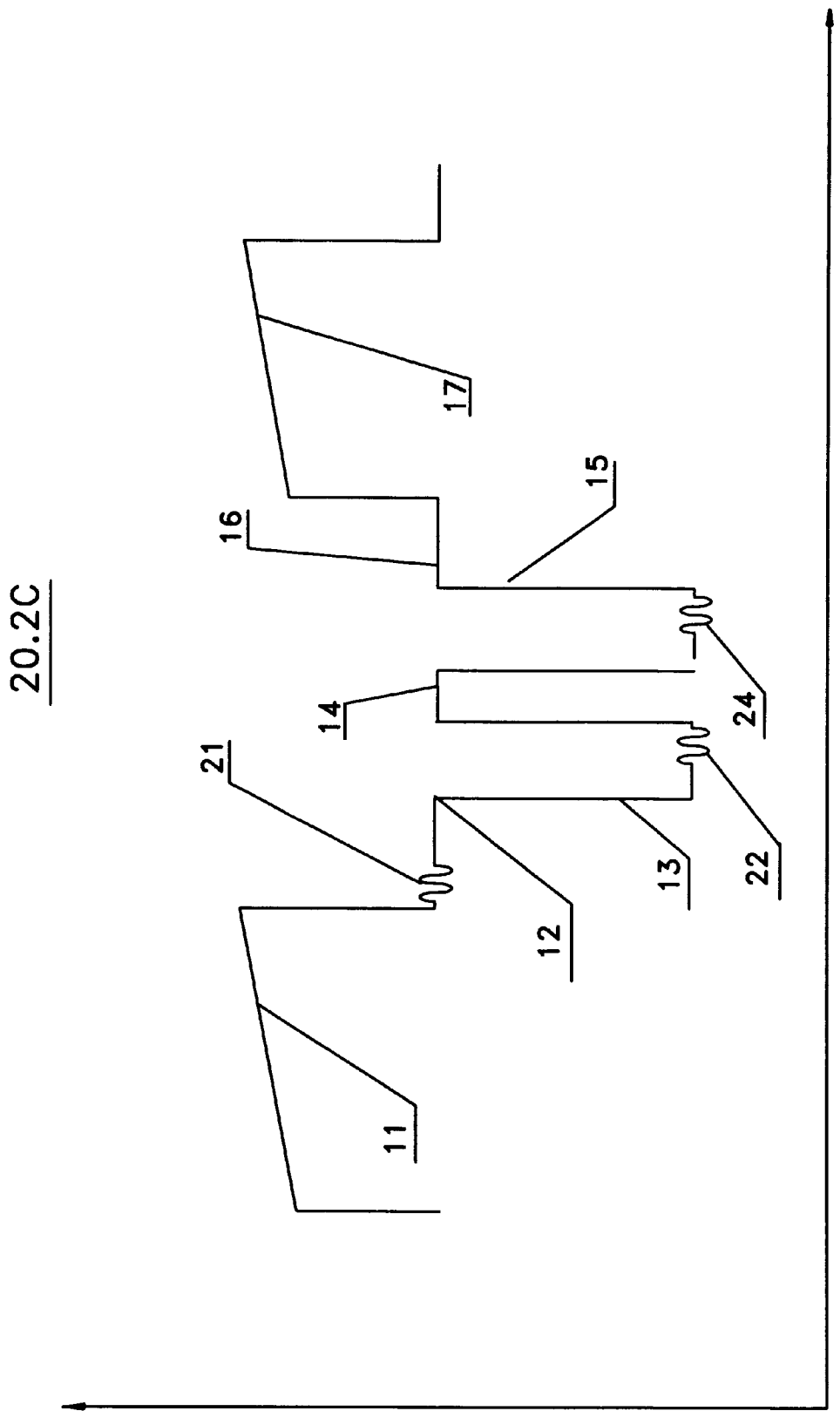

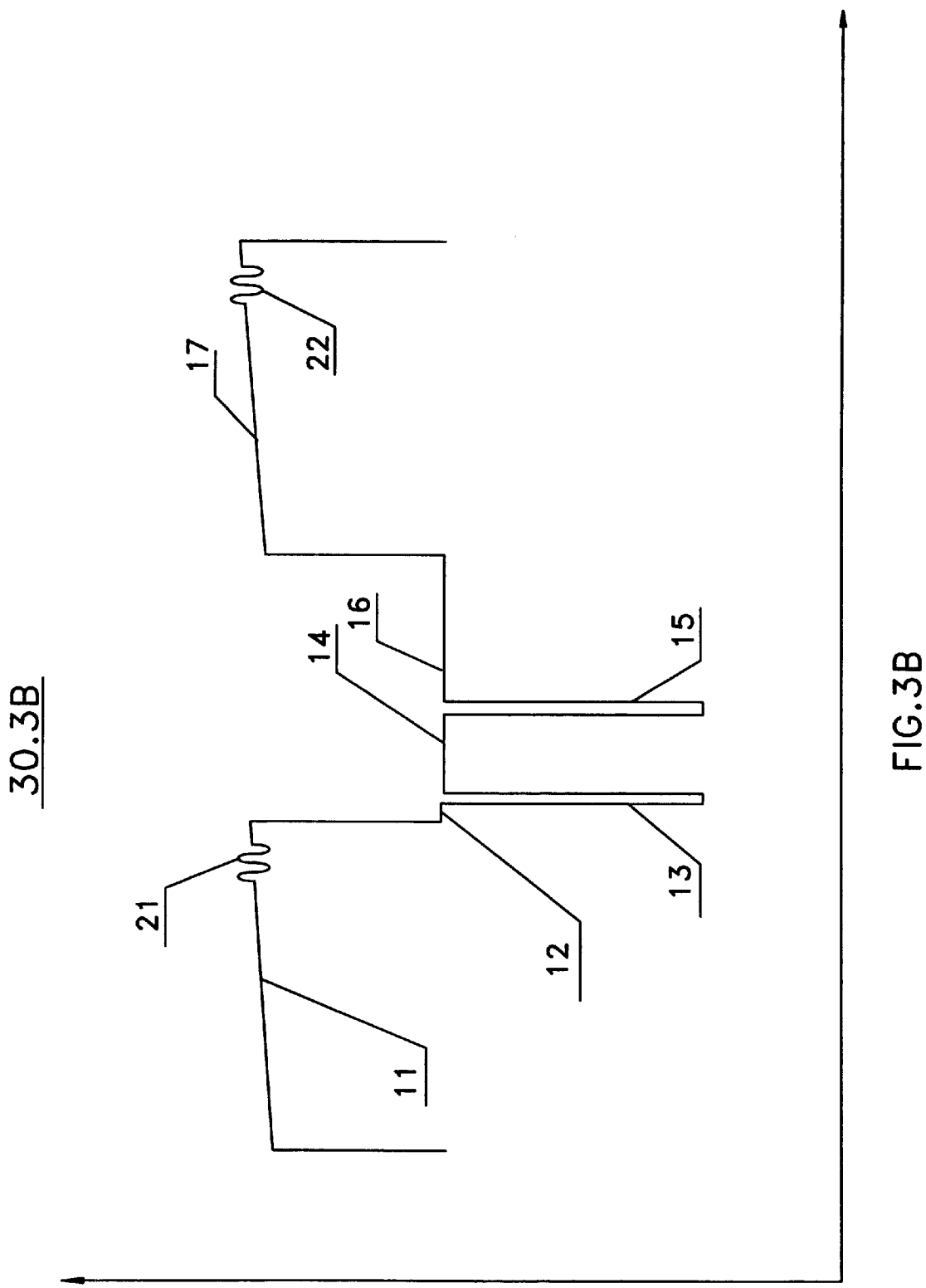

BATTERY CHARGER WITH ENHANCED CHARGING AND CHARGE MEASUREMENT PROCESSES

PRIORITY CLAIM

This patent application claims the priority of U.S. Provisional Patent Application Ser. No. 60/138,413 filed Jun. 8, 1999.

FIELD OF THE INVENTION

The present invention relates to a method and apparatus for rapidly charging a battery by using bipolar waveforms to improve the charge receptiveness of the battery, and for determining the internal condition and state of charge of the battery. The application of the bipolar waveforms for charging also provides for accurate determination of the internal condition and state of charge of the battery.

BACKGROUND OF THE INVENTION

Throughout the 90's, the number of battery-powered devices in the marketplace has grown in dramatic fashion. Dependence on these portable devices has transformed every aspect of our lives, from the critical tools of our professions, such as cellular phones and laptop computers, to the toys our children demand. This increase has fueled remarkable improvements in the design of battery-operated devices which differentiate products in vertical markets—and consume even more power than ever. This paradigm shift, which has taken portability from a novelty to a necessity, has led us to expect our tools to perform reliably and consistently. But even the best-designed portable products have an Achilles' Heel that has not been addressed. Batteries do not deliver the consistent reliability and performance that products require. They lose capacity, they deteriorate, and they allow our critical devices to fail us.

Rechargeable batteries have improved over the years as product designers have moved from nickel cadmium (NiCd) to nickel metal hydride (NiMH) to lithium ion (Li-Ion) to meet the increasing power demands. The nickel metal hydride battery is continually gaining popularity in the market and, up to this point, there has not been a satisfactory method of a terminating the charge cycle. The present termination methods, such as $-\Delta V$ and maximum temperature ($\Delta T/\Delta t$), do not provide a satisfactory result, as batteries will heat up during charge and discharge because of the high level of hydrogen production in this chemistry.

For lead acid batteries the problems are worse. The basis of lead acid charging technology is 150 years old. Users of lead acid batteries experience a number of problems with battery corrosion, performance, and maintenance. Incorrect methods of charge and charge termination adversely affect the energy transformation properties and degrade the cycle life of the battery, thereby increasing the expense for battery maintenance. Currently, there are no accurate methods to determine when to terminate a charge cycle.

For lithium ion batteries, or modifications thereof, the existing, inaccurate methods of determining when to terminate or how to modify the energy transfer to the battery demand costly electronic circuitry inside the battery pack itself in order to prevent overcharging or overdischarging of the battery and to keep the battery operating in a safe temperature range.

Thus, battery reliability problems are still a top customer complaint throughout the portable industry. Newer battery chemistries cannot solve power problems when old charging and battery state monitoring routines are used. With all the effort spent developing new battery chemistries and improving old ones, little effort has been focused on the charging system. Without an effective charging system, a secondary battery is useless. With a standard charging system, a secondary battery is useful for powering a device, but lengthy charge times, capacity loss, and poor product performance are the norm. As long as batteries are a consumable product, and business projections depend on their obsolescence, battery manufacturers have no motivation to, and will not, build a better battery charger.

The following is a description of issued patents that individually offer only a partial solution to the many problems inherent in rechargeable batteries. U.S. Pat. Nos. 4,829,225 and 5,307,000 to Podrazhansky et al. are both prior patents issued to the inventor.

U.S. Pat. No. 4,829,225 to Podrazhansky et al. teaches a special technique for charging a battery with a single discharge pulse.

U.S. Pat. No. 5,307,000 to Podrazhansky et al. employs the use of multiple charge and discharge pulses to obtain an improved charging speed.

U.S. Pat. No. 3,816,807 to Taylor describes a technique for modulating a DC charging current with an AC voltage. The phase change of the modulating AC voltage is sensed with a phase detector and the change in phase is sent as a feedback signal to vary the DC power supply.

U.S. Pat. No. 5,329,219 to Garret describes a method and apparatus for charging a battery including a control circuit for determining the charge rate and charge capacity of a battery.

U.S. Pat. No. 5,331,268 to Pantino, et al. teaches a control for a trickle charge, which begins when a baseline voltage of the battery during a rapid charge attains a predetermined value.

U.S. Pat. No. 5,200,689 to Interiano et al. describes a battery charge controller and fuel gauge which continually monitors the voltage, temperature, and charge and discharge currents for a rechargeable battery, and calculates the battery's charge capacity and charge levels. The charge profile is similar to previously described techniques and is topped off with a trickle charge which will cause dendrite and other problems that are also applicable to the technique described in the '268 patent above.

U.S. Pat. No. 4,878,007 to Gabor et al. uses steep current pulses, superimposed on both charge and discharge pulses to produce a homogeneous electrode surface.

U.S. Pat. No. 4,746,852 to Martin teaches a controller for a battery charger that terminates battery charging operation as a function of a time derivative of the measured battery voltage.

U.S. Pat. No. 4,577,144 to Hodgman et al. describes a technique for distinguishing between primary and secondary batteries by sensing a charging or discharging parameter of a battery placed into the system. A ripple voltage is deemed to reflect the low frequency impedance of the AD battery during charging. A distinction between primary and secondary batteries is thus made as the low frequency impedance for a secondary battery is lower than that impedance for a primary battery of the same physical size.

U.S. Pat. No. 4,740,739 to Quammen et al. describes a battery charger and associated method for charging a DC battery utilizing a step-down transformer with high leakage reactance, and means for rectifying and regulating the step-down transformer output to continuously supply a constant charging current to the battery.

U.S. Pat. No. 3,987,353 to Macharg describes a technique for using charging pulses separated by intervals during which a change in the battery voltage is monitored and used to control the magnitude of the charging pulse.

U.S. Pat. No. 3,857,087 to Jones describes a method for testing lead acid batteries using both transient discharging and transient charging separated by a period of time to allow the battery to recover from either ion depletion or ion adsorption.

SUMMARY OF THE INVENTION

The aforementioned patents, individually or in combination, fail to provide a complete solution to the problems of properly monitoring the electrochemical state of a battery and of improving the receptiveness of the battery to a charge. The present invention provides a better battery charger. The present invention is part of a charging method that offers the first significant opportunity to impact design and functionality in battery-powered devices. The present invention is effective in measuring the battery's parameters so as to allow and control rapid charging. The method and apparatus described in this invention take significant steps to further provide users with a better and more efficient way to recharge their batteries. Additionally, the method described makes battery performance more reliable and consistent. To the developer and ultimately to the end user, this invention may permit rechargeable batteries to last as long as the devices they power. The benefits of this invention may very well result in devices that deliver peak performance as dependably on the 1500th day of use as on the first, thereby reducing the flow of batteries to the waste stream. Highly sensitive, power-dependent products such as medical, consumer, and military devices can then be designed for portability with confidence. Battery failure will no longer hinder work or undermine product performance.

By reliably determining the battery's capacitance, condition, and level of impedance, the present invention determines when the charging process needs to be reduced or even terminated. The present invention also improves the balance of battery cells, and reduces internal heat generation by providing for more efficient ion transport, reduction of the concentration gradients, and increased diffusion rates and intercalation speeds.

With the battery charging techniques of the present invention a microprocessor can determine the state of the charge of the battery at any given time more accurately, and a frozen battery can be thawed much more quickly. When a charge pulse is applied ions are generated near the plate and it takes a finite amount of time for other ions to move away from the plate, and so that fresh electrolyte solution may move toward the plate, to replace the electrolyte solution that has been used, and so that more ions may then be generated. Thus, an ion concentration develops near the plate and, accordingly, an ion concentration gradient develops. By applying a bipolar waveform at predetermined frequencies during wait periods, charge pulses, and/or discharge pulses, the concentration gradient is dramatically reduced, so charging efficiency is maintained, and a more uniform battery plate surface structure is obtained. Therefore, the bipolar waveform provides for a reduction in the overall charging time for the battery while preserving a high plate porosity level and reducing corrosion of the collector grid.

As mentioned above, the application of a charge pulse increases the ion and electrolyte concentration near the plates. As a result, an electrical "double layer" forms, providing a capacitive effect, and has an increased polarization and a voltage potential associated with it. This makes it appear that the battery is accepting a charge when, in reality, it is not. Also, during the insertion of the bipolar waveform, the concentration of ions near the electrode surfaces (the plates) fluctuates with time, so the thickness of the double layer, and the potential associated with it, fluctuate with time. The bipolar waveform modifies the mass transport process inside the battery and thus reduces the thickness of the double layer and reduces ion concentration. The If reduction of the double layer, and the voltage potential developed therein, depend not only on the magnitude of the bipolar waveform, but also on its frequency.

Additionally, the bipolar waveform allows for a measurement of metallic conversion during charging and enables a determination of the battery capacity, as well as a determination as to when to terminate battery charging. The use of the bipolar waveform thus increases the precision of the measurement of the internal impedance and of the determination of the battery status.

The present invention provides a method for charging a battery by the steps of applying a charge pulse to the battery, applying a discharge pulse to the battery, waiting for a rest period after said discharge pulse, applying a bipolar waveform to the battery during the rest period, the bipolar waveform having characteristics of a duration, a voltage level, a current level, a frequency, and a wave shape, wherein at least one of the characteristics is selected to enhance an ability of the battery to receive a next charge pulse.

Another method under the present invention includes the steps of applying a charge pulse to the battery, waiting for a rest period and then applying a bipolar waveform to the battery during the rest period, the bipolar waveform having characteristics of a duration, a voltage level, a current level, a frequency, and a wave shape, wherein at least one of the characteristics is selected to enhance an ability of the battery to receive a next charge pulse, that is, to better accept the energy from the next charge pulse.

Another method under the present invention includes the steps of applying a charge pulse to the battery, applying a bipolar waveform to the battery during the charge pulse, the bipolar waveform having characteristics of a duration, a voltage level, a current level, a frequency, and a wave shape, wherein at least one of the characteristics is selected to enhance an ability of the battery to receive the charge pulse.

Another method under the present invention includes the steps of applying a charge pulse to the battery, applying a bipolar waveform to the battery during the charge pulse, the bipolar waveform having characteristics of a duration, a voltage level, a current level, a frequency, and a wave shape, wherein at least one of the characteristics is selected to enhance an ability of the battery to receive a subsequent charge pulse.

Another method under the present invention includes the steps of applying a charge pulse to the battery, applying a discharge pulse to the battery, and applying a bipolar waveform to the battery during the discharge pulse, the bipolar waveform having characteristics of a duration, a voltage level, a current level, a frequency, and a wave shape, wherein at least one of the characteristics is selected to enhance an ability of the battery to receive a subsequent charge pulse.

The present invention provides a method and apparatus for determining the state of charge of a battery by the steps of applying a charge pulse to said battery, applying a discharge pulse to said battery, waiting for a rest period after said discharge pulse, applying a testing bipolar waveform to said battery during said rest period, measuring predetermined characteristics of said battery during said testing bipolar waveform, and determining the state of charge of the battery based upon said predetermined characteristics which were measured during said testing bipolar waveform.

Another method under the present invention includes the steps of applying a charge pulse to said battery, waiting for a rest period, applying a testing bipolar waveform to said battery during said rest period, measuring predetermined characteristics of said battery during said testing bipolar waveform, and determining the state of charge of the battery based upon said predetermined characteristics which were measured during said testing bipolar waveform.

Another method under the present invention includes the steps of applying a charge pulse to said battery, waiting for a rest period, applying a testing bipolar waveform to said battery during said rest period, measuring predetermined characteristics of said battery during said testing bipolar waveform, and determining the state of charge of the battery based upon said predetermined characteristics which were measured during said testing bipolar waveform.

The present invention also provides a method and apparatus for determining the internal impedance of a battery by the steps of applying a charge pulse to said battery, applying a discharge pulse to said battery, waiting for a rest period after said discharge pulse, applying a testing bipolar waveform to said battery during said rest period, measuring a voltage level of said testing bipolar waveform applied to said battery, measuring a current level of said bipolar waveform passed through said battery, and determining said internal impedance of said battery by dividing said voltage level of said testing bipolar waveform by said current level of said testing bipolar waveform.

Another method under the present invention includes the steps of applying a charge pulse to said battery, waiting for a rest period, applying a testing bipolar waveform to said battery during said rest period, measuring a voltage level of said testing bipolar waveform applied to said battery, measuring a current level of said bipolar waveform passed through said battery, and determining said internal impedance of said battery by dividing said voltage level of said testing bipolar waveform by said current level of said testing bipolar waveform.

Numerous variations and modifications of the methods above are possible. Some of those variations and modifications are listed herein and are described in more detail below. The bipolar waveform is applied at a predetermined point during the rest period. A short technical rest period is applied between the charge pulse and the discharge pulse. A testing bipolar waveform having a testing frequency is applied to the battery during either (i) the rest period and subsequent to the bipolar waveform having the at least one the characteristics, or (ii) a subsequent rest period, the testing frequency being different from the frequency of the bipolar waveform having the at least one the characteristics, predetermined characteristics of the battery are measured during the testing bipolar waveform; and the state of charge of the battery is determined based upon the predetermined characteristics which were measured during the testing bipolar waveform. In response to the step of determining the state of charge of the battery, at least one of the charge pulse, the discharge pulse, and the rest period is adjusted. The voltage level of the testing bipolar waveform applied to the battery is measured, the current level of the bipolar waveform passed through the battery is measured, and the impedance of the battery is determined by dividing the voltage level of the testing bipolar waveform by the current level of the testing bipolar waveform. The voltage level of the battery is measured during the charge pulse, the current level passed through the battery is measured during the charge pulse, and the internal resistance of the battery is determined based on the voltage level of the battery during the charge pulse and the current level passed through the battery during the charge pulse. A discharge pulse is applied to the battery after the step of applying the bipolar waveform.

The present invention therefore provides a technique and apparatus for rapidly charging a battery while extending its life cycle, for determining when to terminate the charging of a battery, for determining the state of charge of a battery, and for determining the internal impedance of a battery. These benefits and solutions provided by the present invention, as well as other advantages and objects of the invention, can be understood from reading the following detailed description of several embodiments of the invention in conjunction with the several figures of the drawing.

BRIEF DESCRIPTION OF THE DRAWING

FIG. 1A is an enlarged plot of a charge cycle with a bipolar waveform superimposed on the beginning of one or more rest periods used in the charging cycles of FIG. 1;

FIG. 2B is an another charge cycle with a bipolar waveform superimposed at the end of one or more discharge periods used in the charging cycles;

FIG. 2C is an another charge cycle with a bipolar waveform superimposed on one or more discharge periods and a technical rest periods used in the charging cycles;

FIG. 3B is another charge cycle with a bipolar waveform superimposed at the end of one or more charge periods used in the charging cycles;

DETAILED DESCRIPTION OF THE INVENTION

Figure 1:
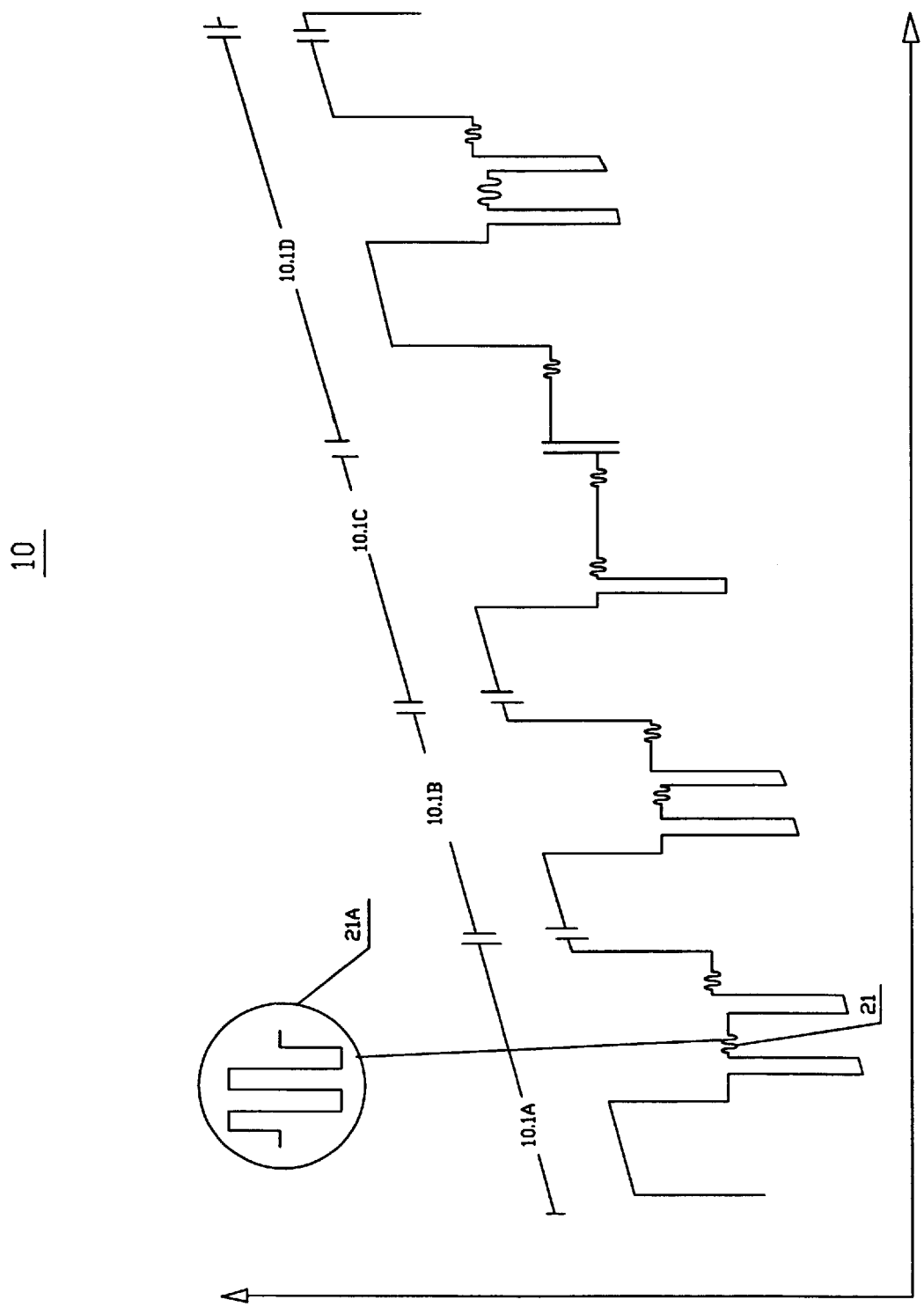
FIG. 1 is a plot of charge cycles where bipolar waveforms are applied to one or more rest periods during the charging of a battery.

The use herein of decimals after numerals identifies specific items whereas the use of the numeral on the left side alone denotes the same item in a general manner. With reference to FIGS. 1, 1A, 11B, 1C, 1D, 2, 2A, 2B, 2C, 3, 3A, and 3B, variations of charge sequence 10, 20 and 30 (10.1, 10.1B, 10.1C, 10.1D, 10.1E, 20.1, 20.1A, 20.1B, 20.1C, 30.1, 30.1A, 30.1B) are shown and are used during the charging of a battery. FIG. 1 is a plot of charge cycles where bipolar waveforms are applied to one or more rest periods during the charging of a battery.

For charging a battery, the bipolar waveform (21, 22, 24) is preferably applied every pulse, as this maximizes the receptiveness of the battery to the charge pulse. The bipolar waveform may be applied less frequently but, as the time between applications of the bipolar waveform is increased, the receptiveness of the battery to the charging pulse will decrease, and the charging time will increase. Insert 21A shows an expanded view of a bipolar waveform 21 where, for convenience of illustration, the bipolar waveform 21 is shown with a square wave waveform.

For measurements, such as determining the state of charge of a battery, the internal impedance of the battery, or the resistance of the battery, the charge sequence 10, 20, or 30 and the bipolar waveforms (21, 22, 24) need not be used continuously but may be applied less frequently, such as once every minute or several minutes, depending upon the type and size of battery being charged.

Other charge cycles, including those shown in U.S. Pat. No. 5,307,000 to Podrazhansky, can be used in between the charge cycles 10, 20 or 30. Hence, the disclosure of U.S. Pat. No. 5,307,000 is incorporated herein by reference thereto, subject to such modifications as described herein for this invention.

If the duration of the bipolar waveforms (21, 22, 24) is too high then the battery tends to heat up. If the duration of the bipolar waveforms is too few then there is not a sufficient mixing action near the electrodes. Generally, if sine waves are the selected wave shape of the bipolar waveform, a duration of approximately three to five sine waves is sufficient to achieve the desired mixing action. Thus, for a frequency of about 200 Hz, a duration for the bipolar waveform (21, 22, 24) of up to 25 milliseconds is sufficient. If the frequency is too high, the degree of electrolyte mixing will be reduced or eliminated. Therefore, a maximum desirable frequency is generally about 500 Hz. Other wave shapes, such as square, triangular, ramp, or even more complex wave shapes, may also be used for the bipolar waveform. Bipolar waveforms are used, such as in 10.1A, 10.11B, 10.1C and 10.1D to alter the wait period (14, 16), and in 20.2A, 20.2B and 20.2C to alter the discharge pulse (13, 15), and in 30.3A and 30.3B to alter the charging pulse (11, 17). The insertion of the bipolar waveforms during wait periods (14, 16) is described in the first through fourth embodiments, the insertion of the bipolar waveforms during discharge pulses (13) is described in the fifth through seventh embodiments, and the insertion of the bipolar waveforms during charge pulses (11, 17) is described in the eighth and ninth embodiments. Discharge pulses are also known as depolarization pulses, and wait periods are also known as rest periods.

In addition, certain of these bipolar waveforms (21, 22, 24) may have a higher frequency so as to enable the measurement of the internal impedance of the battery. Specifically, the frequency and duration of bipolar waveforms (21, 22, 24) are selected so that the capacitance of the battery can be measured. The accuracy of this measurement is enhanced by virtue of the use of the discharge pulses (13, 15).

For measuring the capacitance, condition, or state of charge of a battery, the higher frequency signals used for the bipolar waveforms (21, 22, 24) are preferably in the range of about 10 kHz to about 1 MHz. The capacitance measurement is obtained by first measuring the internal resistance R, of the battery by monitoring the voltage drop across the battery, preferably at the end of the charge pulse (11, 17), and dividing this by the corresponding current passed through the battery at the same time of the voltage measurement.

The impedance Z of the battery is measured using the higher frequency bipolar waveform. The bipolar voltage is measured and the bipolar current are measured at the same time of the voltage measurement, preserving phase information. The impedance Z is determined by dividing the bipolar voltage by the bipolar current. The impedance Z is then used to derive the reactive component $X_{cap(ec)}$, and from this the capacitance $C_{cap}$ of the battery.

$X_{cap(ec)}$ is the imaginary part of impedance f is the frequency of the bipolar signal $Z = R_i + X_{cap(ec)}$ $X_{cap(ec)} = Z - R_i$ $C_{cap(ec)} = 1/(2\pi f(Z - R_i))$ The capacitance is measured during at least two, and preferably several, charge cycles, and changes in its value are monitored. For NiCd batteries and lead acid batteries, as long as the capacitance continues to show a change in value is positive and greater than a predetermined amount, this is interpreted as an indication that the battery is still accepting a charge. When the capacitance measurement fails to indicate a positive change greater than the predetermined amount from the last measurement, or from some other previous measurement, a determination is made that the battery is fully charged and the battery charging process is then preferably terminated. The predetermined amount is determined empirically for that battery type. These measurements are not used for NiMH and Li-ion batteries to determine whether the battery is still accepting a charge or is fully charged. However, these measurements do indicate the amount of temporary plating of lithium on the carbon or graphite electrode of the battery during a charge pulse.

As battery charging takes a relatively long time, it is not necessary to measure the capacitance during each charge cycle. The capacitance measurement can be made, for instance, once every minute, or at such other interval as will assure a timely termination of the charging process without adding significantly to the overall duration of the charging process.

Immediately after a discharge pulse, the ion concentration in the electrolyte solution within the reaction area is low, while on the outside of the reaction area the ion concentration in the electrolyte solution is relatively high. The bipolar waveforms (21, 22) thus mix the electrolyte solution right after the discharge pulses (13, 15). The highly concentrated electrolyte will mix with the low concentration electrolyte and so the concentration gradient between the region inside the reaction area and the region outside the reaction area will thus tend to be lower. The bipolar waveform may be superimposed during the rest periods (14,16) in varying places in a rest period, and may be in different places from rest period to rest period in order to obtain the desired information. The data obtained allows for the modification of the charging process to keep the battery in a charge receptive state.

The bipolar waveforms (21, 22, 24) serve to mix fresh electrolyte from outside the electrode reaction area with the electrolyte within the reaction area and thus reduce overpotential due to a concentration of polarization within the double layer of the battery. The effect of the bipolar waveform is to reduce the internal resistance of the battery. The forced mixing of the higher and lower concentration electrolytes enables a reduction in the wait periods between charge pulses. Thus, charging time can be reduced, and longer rest periods for measurements can be used with little impact on the overall charging time.

If the change in the capacitance is still greater than the predetermined amount, but has begun to fall, this is an indication that the battery is becoming charged. Therefore, even with mixing of the electrolyte, the battery will have less usable electrolyte available near the electrodes and may not be able to accept the full charge pulse. Battery heating, gas generation and other undesirable results may then occur. For NiCd and lead-acid batteries, once the change in the capacitance begins to fall, the charging cycle is terminated. For Li-ion batteries, if the temporary electroplating of metallic lithium begins to decrease, the parameters of the charge pulses, the discharge pulses, and the rest periods are modified so as to reduce the charge being supplied to the battery or to otherwise compensate for that charge so that the battery can accept most or all of the charge.

The charge pulses are modified by reducing the charge current, voltage and/or duration, and/or the frequency of application and/or the number of the charge pulses. The discharge pulses are modified by increasing the discharge current, voltage and/or duration, and/or the frequency of application and/or the number of the discharge pulses. The rest periods are modified by increasing their frequency and/or duration. The data obtained may also be used to determine that the charge being supplied to the battery should be increased, so that the charge pulses, discharge pulses, and rest periods are modified, generally in the reverse of the above, to increase the charge supplied. The charge being supplied may then be increased, preferably slowly, until the data indicates that the battery is receiving the maximum charge it can accommodate.

During charging, the current flowing across the electrode/electrolyte interface is composed of a time averaged DC component $I_{DC}$, and a fluctuating alternating current (AC) component, $I_{AC}$. If $$I(t)=I_{DC}+I_{AC}(t)$$

at the boundary condition, then:

$$C_c=C_c(\infty) \text{ at } t=0 \tag{1}$$

$$C_c=C_c(\infty) \text{ at } y=\infty$$

$$-D\cdot \partial C_c/\partial y = I(t)/nF \text{ at } y=0 \tag{2}$$

where $C_c$ is concentration, t is time, y is the distance from the electrode surface, the symbol "¯" prior to a term denotes the bulk properties, D=d/dt, n=the number of electrons transferred, and F the Faraday constant (96,490 Coulombs per mole).

The concentration $C_c$ is composed of a time invariant steady-state component $C_{c(DC)}$, and a fluctuation component $C_{c(AC)}$.

$$C_{c(y,t)}=C_{c(DC)(y)}+C_{c(AC)(y,t)} \tag{3}$$

Substituting equation (3) into equations (1) and (2) obtains two sets of differential equations and associated boundary conditions, one for the steady state concentration $C_{c(DC)}$ and a second one for the fluctuation concentration $C_{c(AC)}$.

The equations for the steady state concentration are:

$$^{13}C_c=C_c(\infty) \text{ at } y=\infty \tag{4a}$$

$$-D\partial\bar{\ }C_c/\partial y=I_{DC}/nF \text{ at } y=0 \tag{4b}$$

The solution to the above equations gives a surface concentration component $C_c(sur)$ in the form $$C_c(sur)/C_c(\infty)=1-I_{DC}/I_{lim} \tag{5}$$

where ¯Csur is a surface average concentration measured at a battery surface, and $I_{lim}$ is the limiting current density for a given convective condition.

The thickness of the steady state Nernst diffusion layer is dependent on the concentration gradient at the electrode surface.

The equations for the fluctuation concentration are:

$$\partial C/\partial t + \bar{V}\cdot\bar{\ }\Delta C_{c(AC)}=D\Delta^2 C_{c(AC)} \tag{6a}$$

$$C_{c(AC)}=0 \text{ at } t=0 \tag{6b}$$

$$C_{c(AC)}=0 \text{ at } y=\infty \tag{6c}$$

$$-D\partial C_{c(AC)}/\partial y=I_{AC}(t)/nF \text{ at } y=0 \tag{6d}$$

Normally the concentration fluctuation occurs within thin regions of the steady-state Nernst diffusion layer where the contribution of the convective flux term $\bar{V}\cdot\bar{\ }\Delta C_c$: is relatively small. To increase fluctuation of concentration, the insertion of bipolar waveforms within the Nernst diffusion layer will reduce overall concentration, prevent overpotential and reduce heat by reducing internal concentration resistance.

First Embodiment:

The first embodiment of the invention is shown in FIG. 1A, which is an enlarged plot of a charge cycle with a bipolar waveform superimposed on the beginning of one or more rest periods used in the charging cycles of FIG. 1. There is a charge pulse (11) followed by a very short technical rest period (12), followed by a discharge pulse (13), and followed by a rest period (14). A technical rest period preferably, but not necessarily, has a very short duration. The duration may be only as long as the time needed for the charging circuit to switch from applying a charging pulse to applying a discharging pulse, or the time needed for the application of a bipolar waveform. After the rest period (14), a second discharge pulse (15) and a second rest period (16) are applied before the next charging pulse (17). The bipolar waveforms (21, 22) are inserted at the beginning of the first (14) and second (16) rest periods.

Figure 1B:
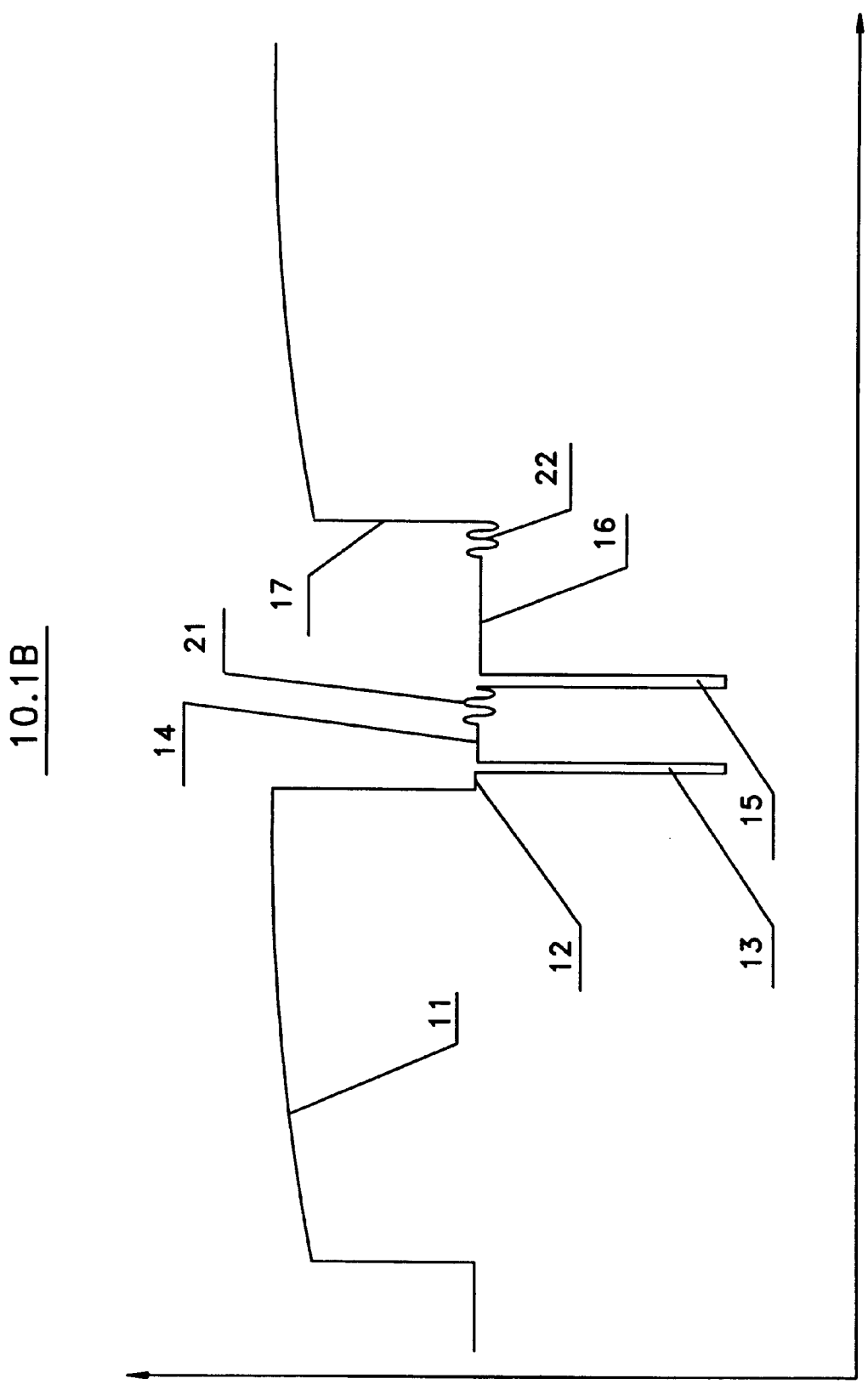
FIG. 1B is another charge cycle with a bipolar waveform superimposed towards the end of one or more rest periods used in the charging cycles.

Second Embodiment:

The second embodiment of the invention is shown in FIG. 1B, which is another charge cycle with bipolar waveforms (21, 22) superimposed towards the end of one or more rest periods. Charge cycle 10.1B is similar to charge cycle 10.1A but in 10.1B the bipolar waveforms (21, 22) do not alter the wait periods (14, 16) at their starts, but at their ends. There is a charge pulse (11) followed by a very short technical rest period (12), followed by a discharge pulse (13), and followed by a rest period (14). After the rest period (14), a second discharge pulse (15) and a another rest period (16) are applied before the next charging pulse (17). After depolarizing the battery by the discharge pulses (13,15), the measurement of impedance at the end of the rest periods (14, 16) using bipolar waveforms (21, 22) allows for precise measurement. The mixing role of the bipolar waveform (22) is diminished by placing the bipolar waveform at the end of the rest period but the impedance and metal conversion measurements are improved. The mixing can be improved, and the concentration gradient reduced, prior to measurement by inserting additional bipolar waveforms (21, 22) at the beginning of the rest periods (14, 16) as described in the first embodiment.

Figure 1C:
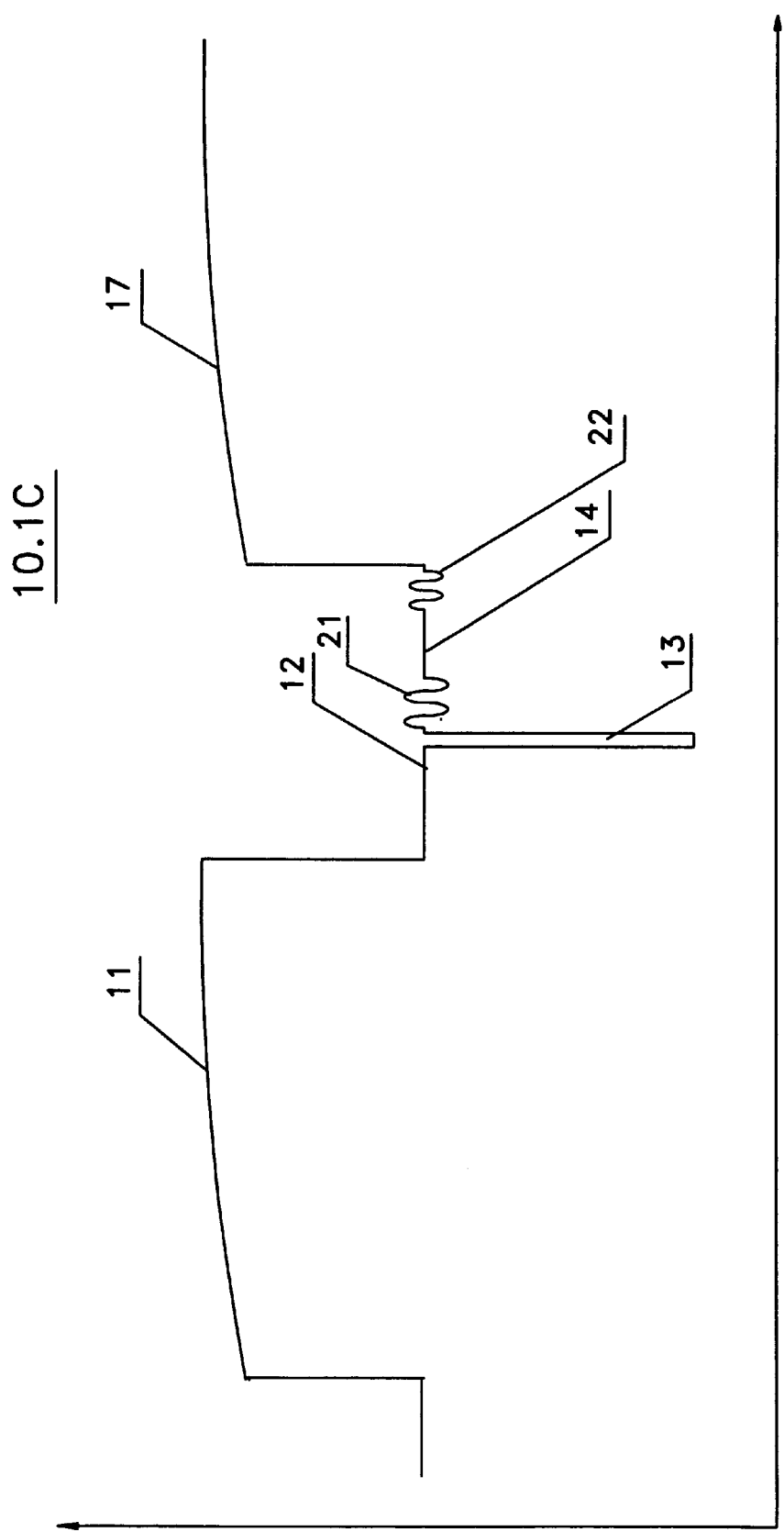
FIG. 1C is another charge cycle with one or more bipolar waveforms superimposed on a rest periods used in the charging cycle which only contains one discharge pulse rest period.

Third Embodiment:

The third embodiment of the invention is shown in FIG. 1C, which is another charge cycle with one or more bipolar waveforms superimposed on a rest periods used in the charging cycle which only contains one discharge pulse and which is followed by a rest period. There is a charge pulse (11), followed by a preferably very short technical rest period (12), followed by a first discharge pulse (13), followed a rest period (14) before the next charging pulse (17) is applied. The bipolar waveforms (21, 22) are inserted in the rest period following the discharge pulse (13). The bipolar waveforms (21) are inserted at the beginning of the wait period for electrolyte mixing, and another a bipolar waveform (22) is inserted at the end of wait period (14) to measure the battery's impedance. The bipolar waveforms (21, 22) can also be inserted for electrolyte mixing purposes during the first technical rest period (12) and/or during a second rest period (14), and then also inserted in the second rest period (14) for measurement purposes. As previously explained, the bipolar waveform (22) need not occur every cycle (10, 20, 30).

Figure 1D:
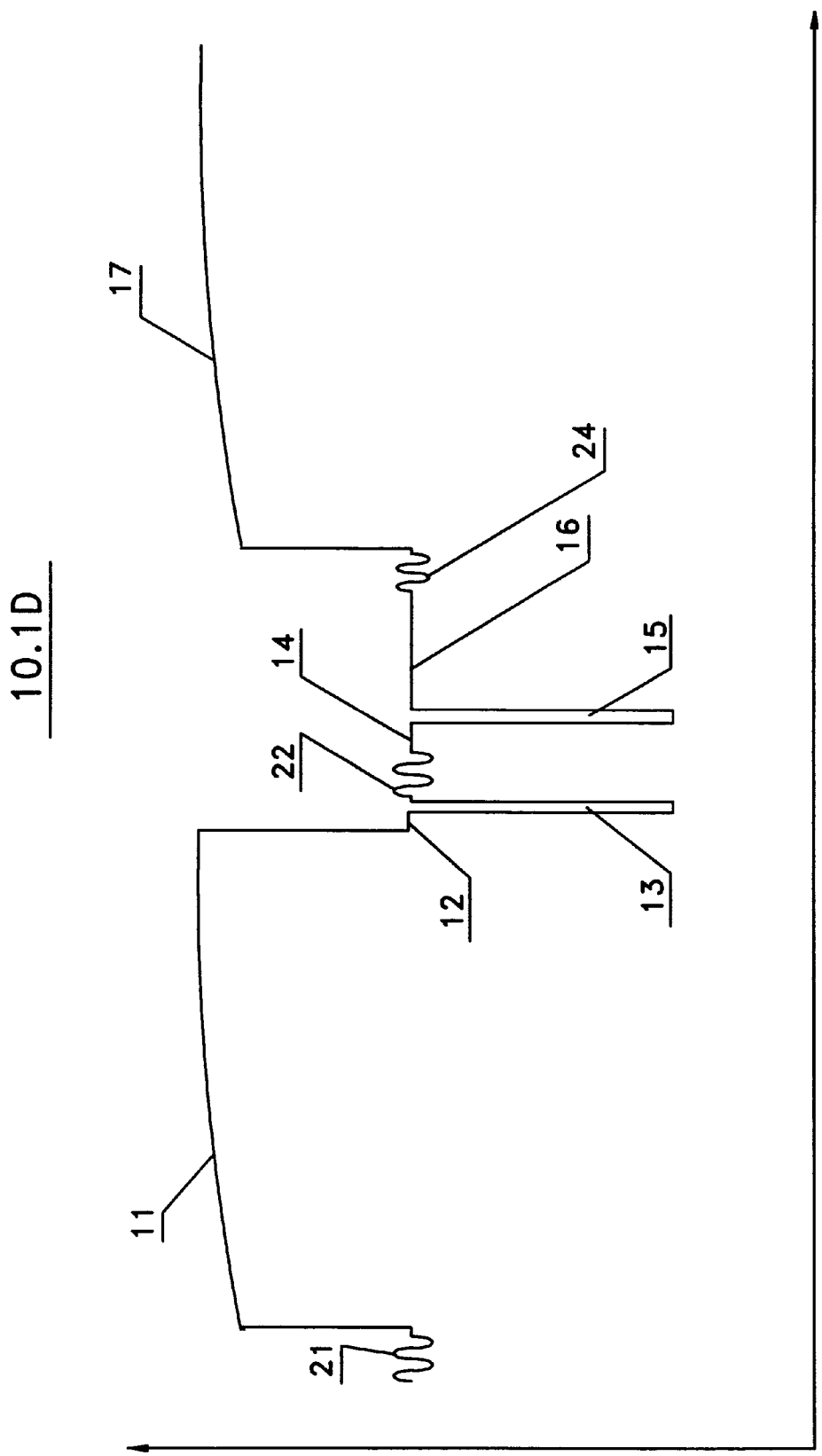
FIG. 1D is another charge cycle with multiple bipolar waveforms superimposed on one or more rest periods used in the charging cycles.

Fourth Embodiment:

The fourth embodiment of the invention is shown in FIG. 1D, which is another charge cycle with multiple bipolar waveforms superimposed on one or more rest periods used in the charging cycles. Charge cycle 10.1D is similar to charge cycle 10.1A but the first bipolar waveform (21) is located just prior to the beginning of the charge pulse (11), the second bipolar waveform starts at the beginning of the wait period (14), while the third bipolar waveform is timed to occur near the end of wait period (16). There is a charge pulse (11) followed by a preferably short technical rest period (12), followed by a discharge pulse (13), and followed by a rest period (14). After the rest period (14), a second discharge pulse (15) and another rest period (16) are applied before the next charging pulse (17). The bipolar waveforms (21, 22 and 24) are inserted in the rest periods (14, 16) and also immediately prior to beginning of charge pulse (11, 17) if the rest period preceding the charge pulse does not have a bipolar waveform. Bipolar waveform (21) will be different from bipolar waveform (24) if there are additional discharge pulses and rest periods subsequent to the discharge pulse (15) and wait period (16) shown.

Figure 2:
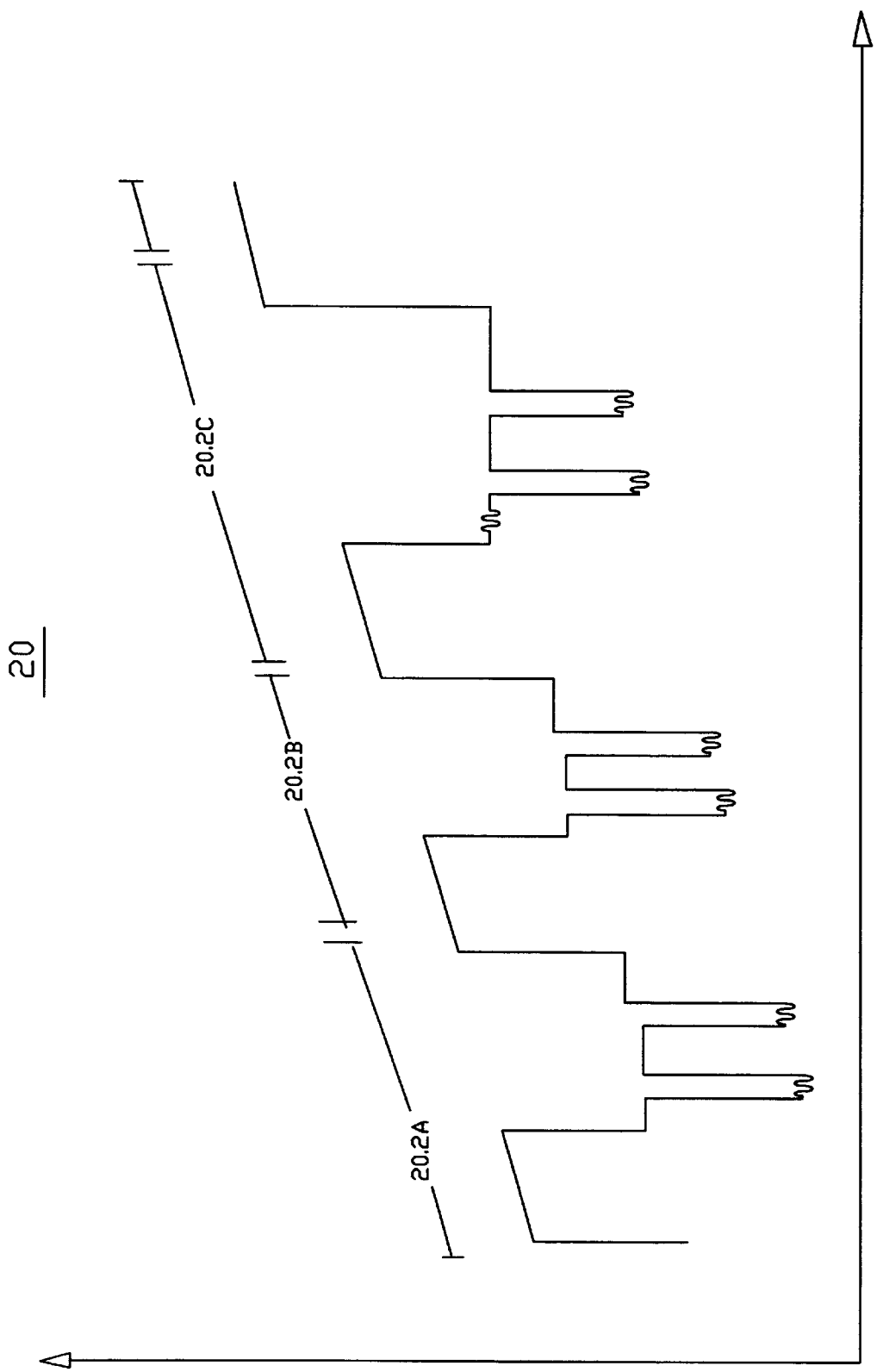
FIG. 2 is a plot of charge cycles where bipolar waveforms are applied to one or more discharge periods during the charging of a battery.
Figure 2A:
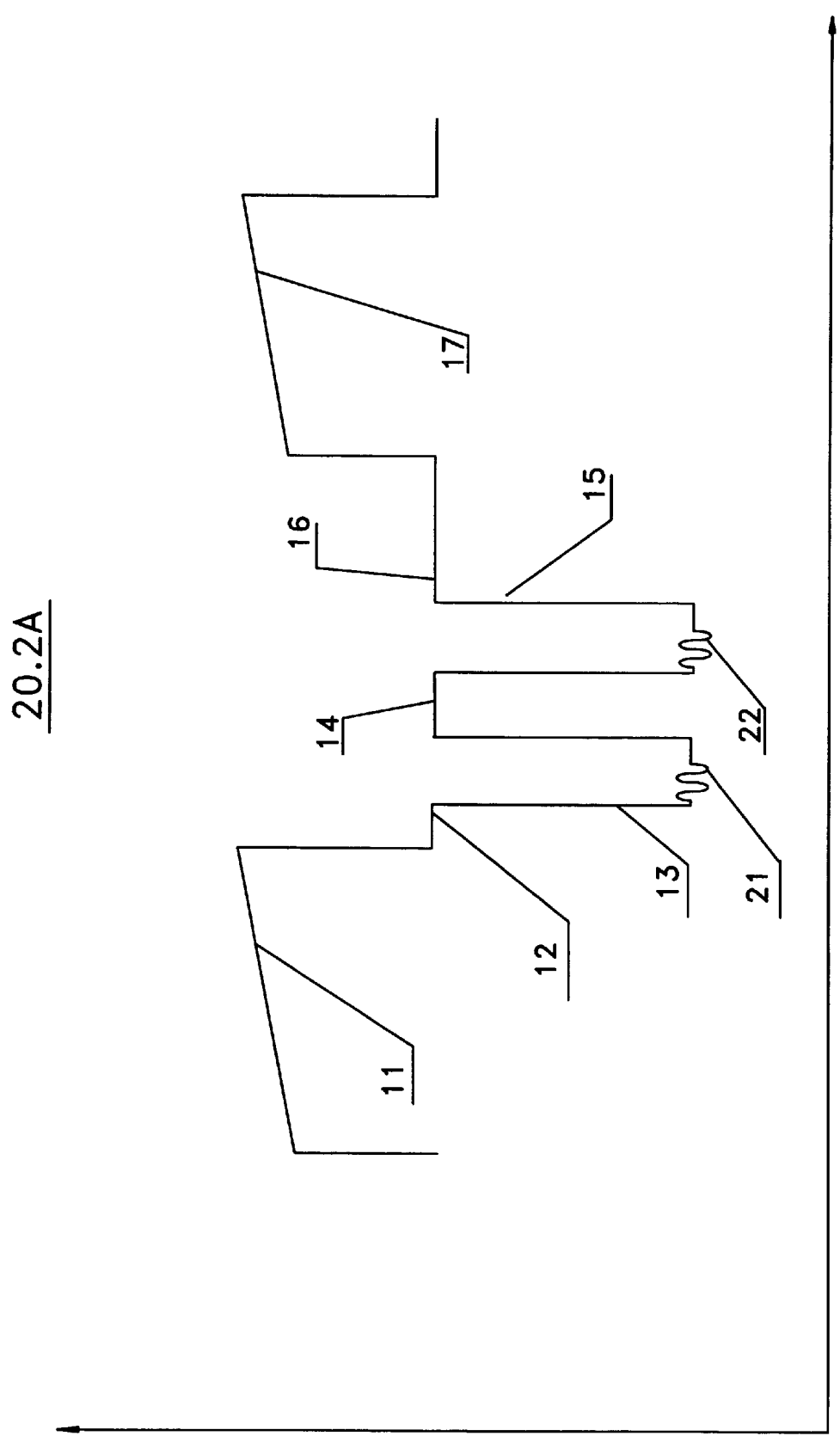
FIG. 2A is an enlarged plot of a charge cycle with a bipolar waveform superimposed in the beginning of one or more discharge periods used in the charging cycles of FIG. 2.

Fifth Embodiment:

The fifth embodiment of the invention is shown in FIG. 2A. There is a charge pulse (11) followed by a short technical rest period (12), followed by a discharge pulse (13), and followed by a rest period (14). After the rest period (14), a second discharge pulse (15) and, preferably, a second rest period (16) are applied before the next charging pulse (17). The bipolar waveforms (21 and 22) are inserted at the beginning of the first (13) and second (15) discharge periods. The insertion of bipolar waveforms (21, 22) allows for the measurement of internal impedance of the battery at the beginning of the discharge pulses.

Sixth Embodiment:

The sixth embodiment of the invention is shown in FIG. 2B. There is a charge pulse (11) followed by a very short technical rest period (12), followed by a discharge pulse (13), and followed by a rest period (14). After the rest period (14), a second discharge pulse (15) and, preferably, a second rest period (16) are applied before the next charging pulse (17). The bipolar waveforms (21 and 22) are inserted at the end of the first (13) and second (15) discharge pulses. This allows for the measurement of the internal impedance at the end of the discharge pulses. When used in conjunction with the embodiment of FIG. 3, it also allows for the comparison of impedance measured during charge pulse (11) and rest periods (14, 16). During the application of a charge pulse (11), oxygen is produced. For best results, excess oxygen should be absorbed during the discharge pulses (13, 15) before the next charge pulse is applied. If the oxygen has not be been absorbed, then the impedance measurement will be much higher than if the oxygen has been reabsorbed. The measurements of internal impedance toward the ends of the discharge pulses (13, 15) indicate whether the excess oxygen gas produced during charge pulse (11) was totally absorbed during the discharge pulses (13, 15). If the oxygen gas was not totally absorbed, then the amplitude and/or duration of one or both of the discharge pulses (13, 15) can be increased so that the impedance measurement at the end of the discharge pulse (13, 15) indicates that the gas has been completely absorbed.

Seventh Embodiment:

The seventh embodiment of the invention is shown in FIG. 2C. There is a charge pulse (11) followed by a very short technical rest period (12), followed by a discharge pulse (13), and followed by a rest period (14). After the rest period (14), a second discharge pulse (15) and, preferably, a second rest period (16) are applied before the next charging pulse (17). The bipolar waveforms (21, 22 and 24) are inserted at the beginning of the first (13) and second (15) discharge periods as well as the technical rest period (12). The application of the bipolar waveform (21) provides for electrolyte mixing prior to a discharge pulse.

Figure 3:
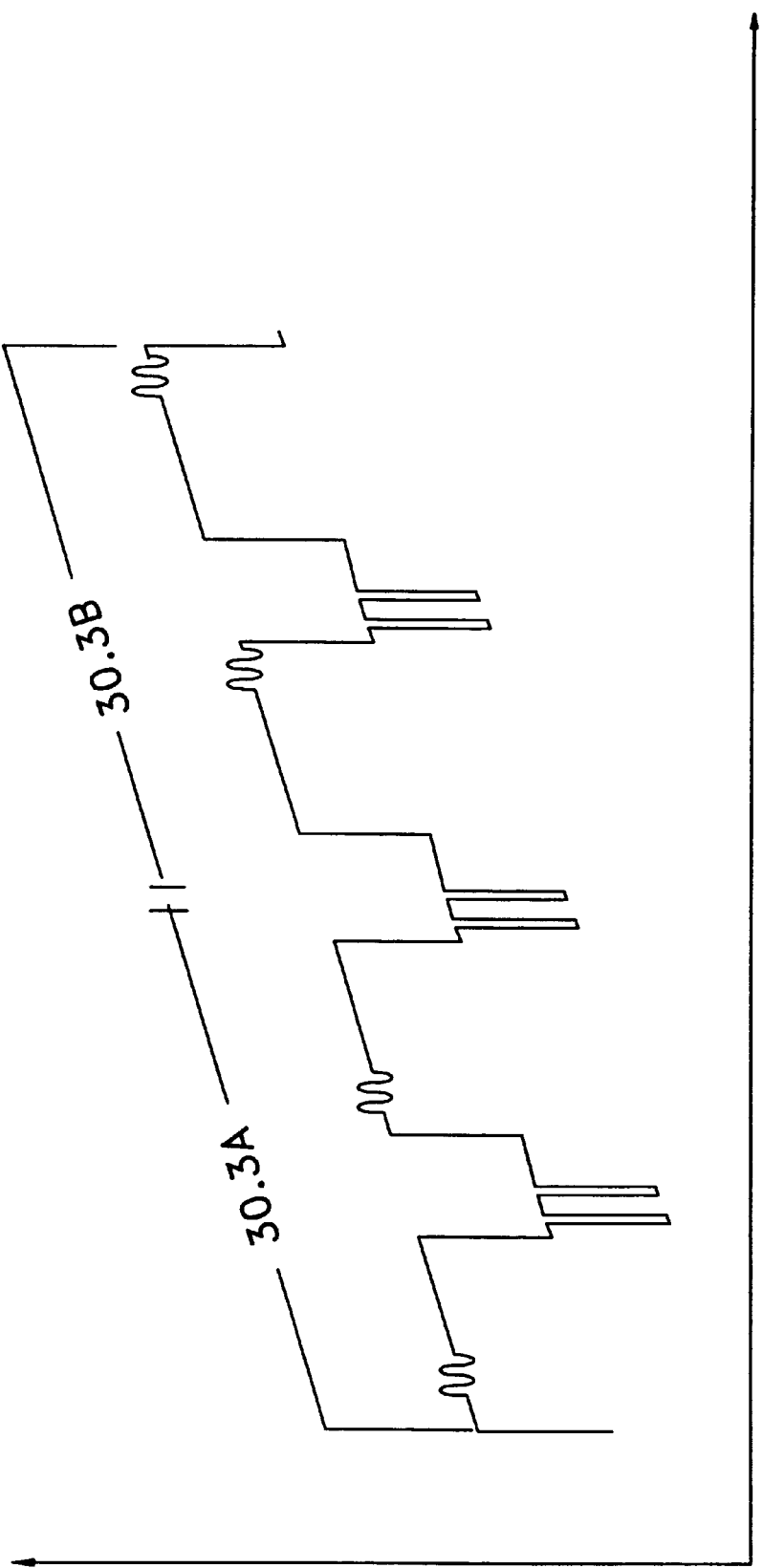
FIG. 3 is a plot of charge cycles where bipolar waveforms are applied to one or more charge periods during the charging of a battery.
Figure 3A:
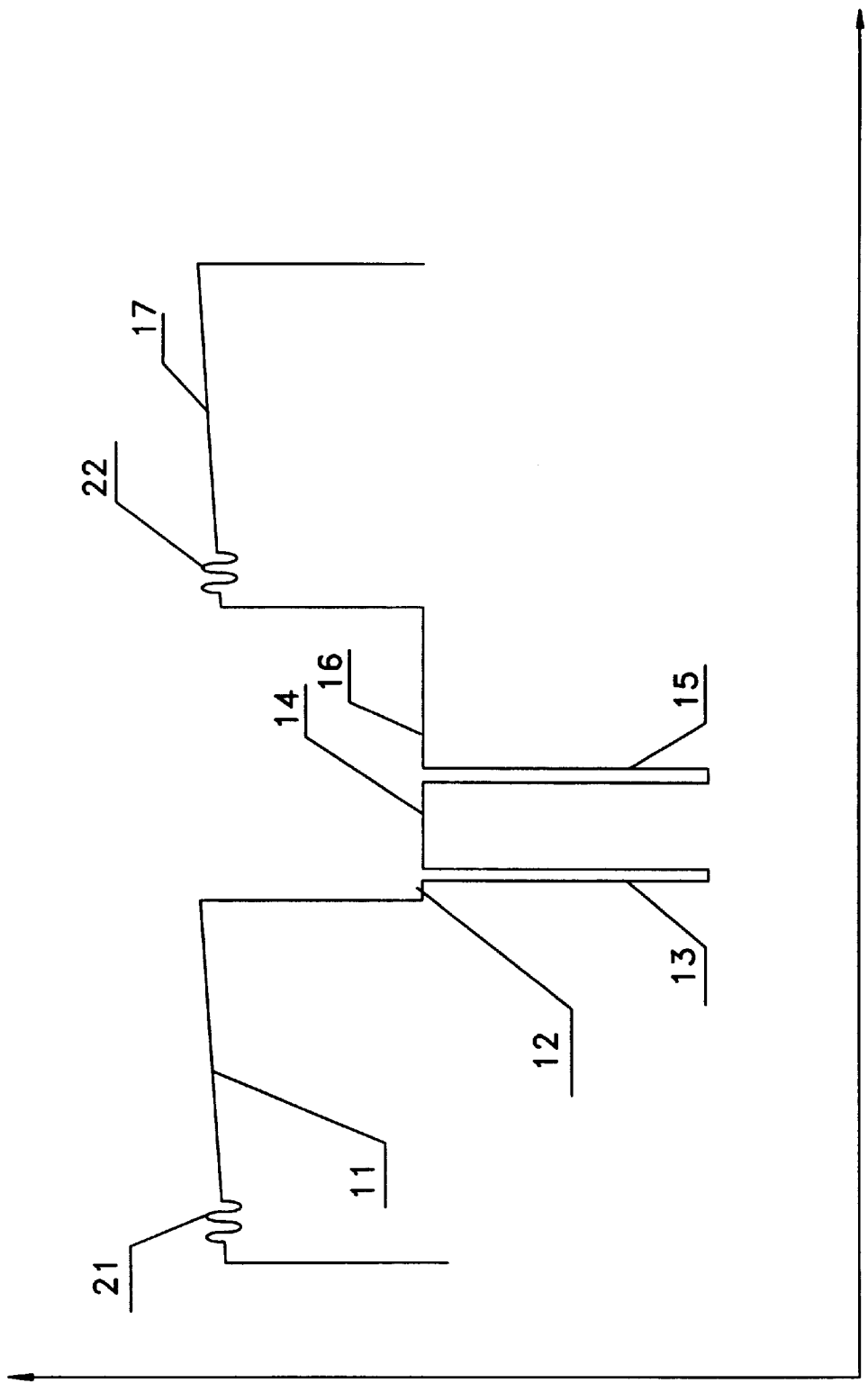
FIG. 3A is an enlarged plot of a charge cycle with a bipolar waveform superimposed in the beginning of one or more charge periods used in the charging cycles of FIG. 3.

Eighth Embodiment:

The eighth embodiment of the invention is shown in FIG. 3A. There is a charge pulse (11) followed by a very short technical rest period (12), followed by a discharge pulse (13), and followed by a rest period (14). After the rest period (14), a second discharge pulse (15) and, preferably, a second rest period (16) are applied before the next charging pulse (17) is applied. The bipolar waveforms (21 and 22) are inserted at the beginning of the first (11) and second (17) charge periods. The insertion of bipolar waveforms (21, 22) at the beginning of charge pulses (11, 17) allows for the measurement of internal impedance of the battery during a charge pulse. In a manner similar to that of the sixth embodiment, the measurements of internal impedance toward the ends of the charge pulses (11, 17) indicate whether excess oxygen gas was produced during a charge pulse. If so, then the amplitude, duration, and/or repetition rate of the charge pulses can be decreased, or parameters regarding the discharge pulses and/or wait periods can be adjusted accordingly.

Ninth Embodiment: The ninth embodiment of the invention is shown in FIG. 3B. There is a charge pulse (11) followed by a very short technical rest period (12), followed by a discharge pulse (13), and followed by a rest period (14). After the rest period (14), a second discharge pulse (15) and, preferably, a second rest period (16) are applied before the next charging pulse (17). The bipolar waveforms (21 and 22) are inserted at the end of the first (11) and second (17) charge pulses. The insertion of bipolar waveforms (21, 22) at the end of the charge pulses allows for the measurement of internal impedance of the battery at the end of a charge pulse and a determination of the gas produced at the end of the charge pulse. This measurement thus reveals the difference in the impedance between the beginning of the charge pulse and the impedance at the end of the charge pulse, and thus provides for a comparison of gas production at the end of a charge pulse to that at the beginning of a charge pulse, as in the eighth embodiment. This allows for the determination of the duration of the following charge pulses. If the gas production is increasing too rapidly or is too high then the magnitude and/or duration of the next charge pulse is reduced.

Figure 4:
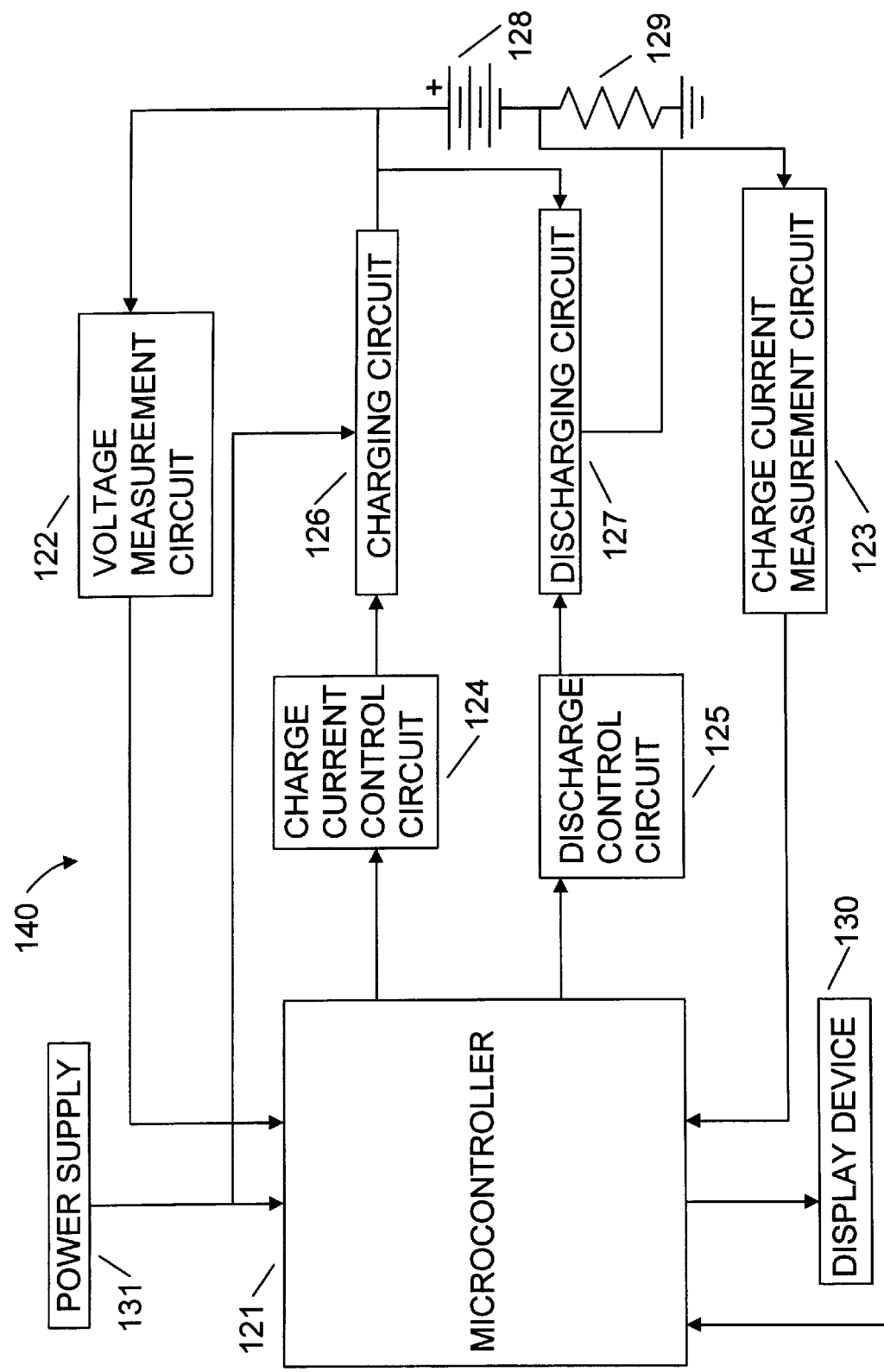
FIG. 4 is a block diagram of an apparatus in accordance with the invention for use in charging a battery.

In FIG. 4 a block diagram of a charger 140 in accordance with the invention is shown: 121 is a microcontroller or microprocessor; 122 is a circuit for measuring the battery voltage; 123 is a circuit for measuring the charging current; 124 is a control circuit for control over the charge currents; 125 is a discharge control circuit; 126 is a transistor or other semiconductor device for controlling the charge current to the battery; 127 is a discharge current transistor; 128 is a the battery to be charged and which can be a lead acid cell, a nickel battery, metal hydride or lithium-based cell; 129 is a shunt resistor used to measure the charging and discharging currents; 130 is a display which can show capacity or battery voltage; 131 is a power supply used to drive the microcontroller and supply electrical energy to charge battery 128; and 132 is an input keyboard or other device which allows the operator to specify the battery parameters, such as the battery type, or voltage, or other rating, or allows the operator to instruct the charger 140 to charge the battery even if the battery is completely discharged (the battery voltage is zero). In another embodiment, the charger 140 is designed only for a particular battery type and, in this case, it is not necessary for the operator to specify any battery parameters. In another embodiment, the operator is not allowed to instruct the charger 140 to charge the battery even if the battery is completely discharged. In such a case, the battery must be briefly charged on another system so that the battery voltage will be within the acceptable parameters.

When a battery 128 is installed into the charger 140 the microcontroller 121, via circuitry 122 senses the battery voltage to determine if it is normal, that is, within acceptable limits. If the voltage on battery 128 is lower than normal, the controller 121 will not charge the battery 128 and will send information to display 130 with an explanation of the problem.

If the voltage on the inserted battery 128 is normal the processor 121 begins a test procedure to determine if the battery may be charged. The testing procedure is to measure the battery's internal resistance. The measured internal resistance is then compared with a range of values in a table for that type of battery. If the internal resistance is not too high then the battery may be charged so the processor 121 starts to charge the battery via circuitry 124 and transistor switch 126. Processor 121, via circuitry 124, sends a signal to transistor switch 125 to enable it to apply a charging pulse 11. If the internal resistance is too high, then the battery may not be charged so the controller 121 will not charge the battery 128 but will send information to display 130 with an explanation of the problem. The "too high" internal resistance value is determined empirically for each type of battery.

Figure 5:
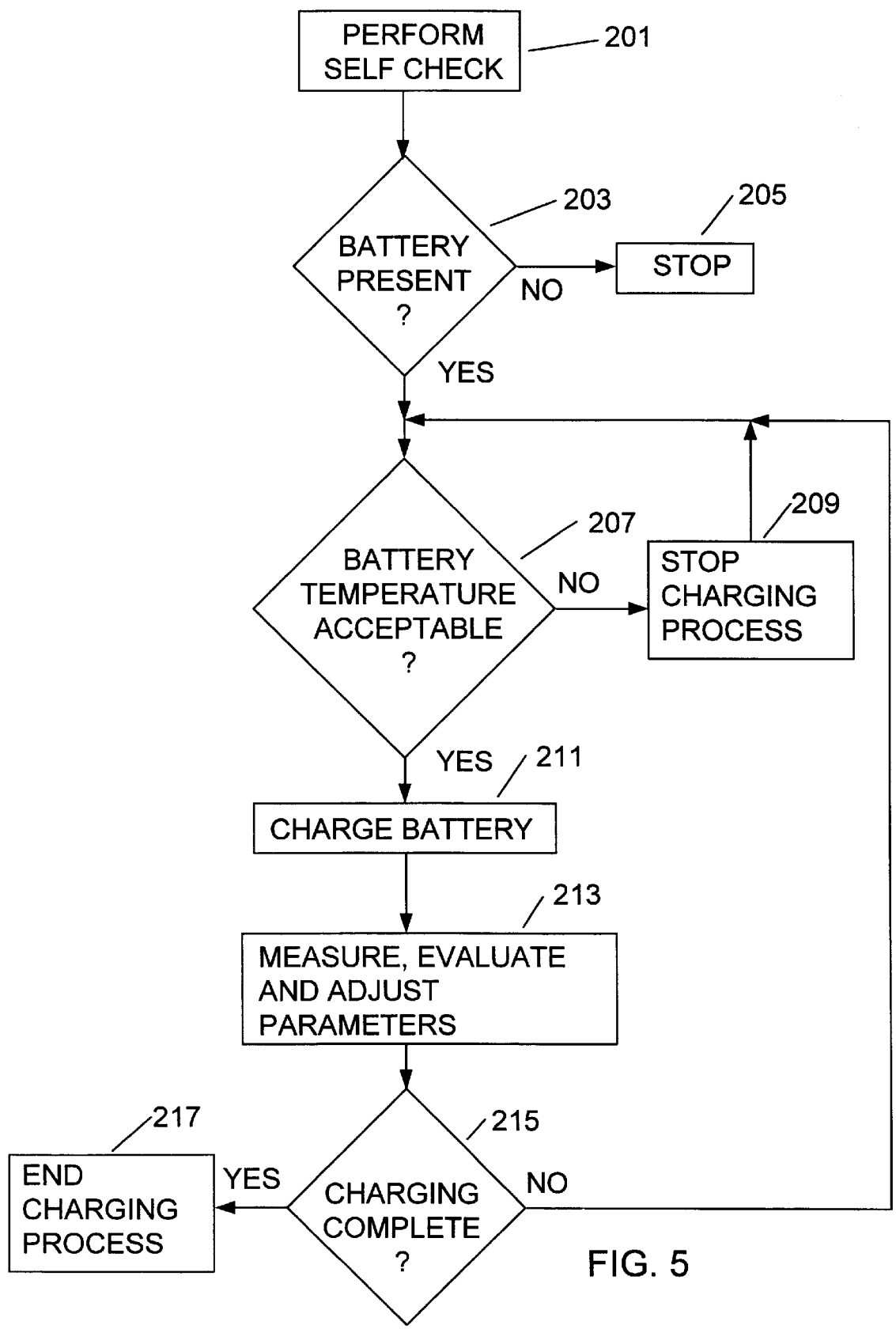
FIG. 5 is a general flow chart for use in a charging process in accordance with the invention for applying a battery charging technique of this invention.

FIG. 5 illustrates a flow chart for operating a charger in accordance with the present invention. Other procedures for operation of a charger can be implemented and/or the sequence of steps modified without departing from the scope of the present invention.

The charger 140 first performs 201 a self check when it is initially turned on. It then verifies 203 the presence of the battery, and the connection of the charger to the battery, by checking for a battery voltage and/or a resistance (non-zero, non-infinite) which is indicative of a battery being present. If there is no battery, the charger stops operation 205 until a battery is properly inserted and connected. The verification of the battery presence may be started automatically after the self test, or may be done at the instance of the user, such as by checking to see whether the user has pressed a button or taken some other action to indicate that the charger should test for the presence of the battery. If the battery is present, the charger verifies 207 that the battery temperature is within acceptable limits. If the battery temperature is within acceptable limits, the charger will begin charging 211 the battery. The charging state may be indicated by any convenient means, such as flashing a particular light emitting diode (LED), or by flashing an LED at a predetermined rate.

If the battery temperature is not within acceptable limits then the charging process will be stopped at step 209 and the battery temperature will be periodically tested 207 until the battery temperature is within acceptable limits, at which point the charging 211 is resumed. An incorrect battery temperature may also be indicated by any convenient means, such as flashing another LED, turning on another LED, changing the flashing rate of an LED, etc.

As the charger is charging the battery the charger will periodically measure and evaluate 213 the battery parameters, such the resistance, the impedance, and the open circuit voltage (OCV) of the battery to determine the state of charge of the battery and that the battery is accepting the charge, and to adjust, if necessary, the charging parameters, such as the number, duration, frequency, magnitude, etc., of the charge pulses, the discharge pulses, and the various rest or wait periods. Step 215 tests whether charging is complete, such as by evaluating the battery open circuit voltage (OCV), the battery resistance, the battery impedance, the battery gassing, etc. If so, then the charging process is ended 217, and this may be indicated by any convenient means. If charging is not complete, then a return is made to steps 207 and 211 where charging is continued if the battery temperature is acceptable.

The battery OCV may be evaluated by comparing it to a predetermined OCV appropriate for that battery type. If the measured OCV is not equal to the predetermined OCV the charger will continue to charge the battery. When the measured OCV is equal to the predetermined OCV the system will stop charging the battery.

The battery resistance, battery impedance, and battery gassing rate are evaluated as described above.

In the description above, "first", "second", and "additional" refer to the sequence of the items being considered, and are not necessarily the first, second or additional items actually applied. For example, "first discharge pulse" refers to the first discharge pulse being considered, which may or may not be the first discharge pulse following a charge pulse. It may be the first discharge pulse following the charge pulse, or it may be the third or fourth discharge pulse following the charge pulse, but it is the first discharge pulse being considered for the action being performed, such as applying a bipolar pulse. In the preferred embodiment, the battery is preferably neither substantially charged nor substantially discharged during a rest or wait period. Leakage currents, testing currents, and other such small currents during rest or wait periods are not considered to substantially charge or substantially discharge the battery.

The invention may be implemented in ways other than the ones described above by a person skilled in the art without departing from the scope of the present invention, as defined by the appended claims.

| Listing of elements | |
|---|---|
| 10, 20, 30 | Charge sequences |
| 11, 17 | Charge pulses |
| 12, 14, 16 | Rest periods |
| 13, 15 | Discharge pulses |
| 21, 22, 24 | Bipolar waveforms |
| 121 | Microcontroller or microprocessor |
| 122 | Circuit for measuring the battery voltage |
| 123 | Circuit for measuring the charging current |
| 124 | Control circuit for control over the charge currents |
| 125 | Discharge control circuit |
| 126 | Device for controlling the charge current to the battery |
| 127 | Discharge current transistor |
| 128 | Battery to be charged |
| 129 | Shunt resistor used to measure the charging and discharging currents |
| 130 | Display |
| 131 | Power Supply |
| 132 | Input keyboard or device |
| 140 | Charger |
| 201, 203, 205, 207, 209, 211, 213, 215, 217 | Flowchart elements |

We claim:

1. A method for charging a battery, comprising:

applying a charge pulse to said battery;

applying a discharge pulse to said battery;

waiting for a rest period after said discharge pulse;

applying an enhancement bipolar waveform to said battery during said rest period, said enhancement bipolar waveform having characteristics of a duration, a voltage level, a current level, a frequency, and a waveshape, wherein at least one of said characteristics is selected to enhance an ability of said battery to receive a next charge pulse;

applying a testing bipolar waveform having a testing frequency to said battery during either (i) said rest period and subsequent to said enhancement bipolar waveform, or (ii) a subsequent rest period, said testing frequency being different from said frequency of said enhancement bipolar waveform;

measuring predetermined characteristics of said battery during said testing bipolar waveform;

determining the state of charge of the battery based upon said predetermined characteristics which were measured during said testing bipolar waveform; and adjusting at least one of said charge pulse, said discharge pulse, and said rest period, in response to said step of determining the state of charge of the battery.

2. The method of claim 1 wherein said enhancement bipolar waveform is applied at a predetermined point during said rest period.

3. The method of claim 1 and, between said charge pulse and said discharge pulse, further comprising the step of applying a short technical rest period.

4. The method of claim 1 and further comprising:

measuring a voltage level of said testing bipolar waveform applied to said battery;

measuring a current level of said testing bipolar waveform passed through said battery; and determining an impedance of said battery by dividing said voltage level of said testing bipolar waveform by said current level of said testing bipolar waveform.

5. The method of claim 1 and further comprising:

measuring a voltage level of said battery during said charge pulse;

measuring a current level passed through said battery during said charge pulse;

determining an internal resistance of said battery based on said voltage level of said battery during said charge pulse and said current level passed through said battery during said charge pulse.

6. A method for charging a battery, comprising:

applying a charge pulse to said battery;

waiting for a rest period; and applying an enhancement bipolar waveform to said battery during said rest period, said enhancement bipolar waveform having characteristics of a duration, a voltage level, a current level, a frequency, and a waveshape, wherein at least one of said characteristics is selected to enhance an ability of said battery to receive a next charge pulse;

applying a testing bipolar waveform having a testing frequency to said battery during either (i) said rest period and subsequent to said enhancement bipolar waveform, or (ii) a subsequent rest period, said testing frequency being different from said frequency of said enhancement bipolar waveform;

measuring predetermined characteristics of said battery during said testing bipolar waveform;

determining the state of charge of the battery based upon said predetermined characteristics which were measured during said testing bipolar waveform; and adjusting at least one of said charge pulse and said rest period in response to said step of determining the state of charge of the battery.

7. The method of claim 6 and further comprising applying a discharge pulse to said battery after said step of applying said enhancement bipolar waveform.

8. The method of claim 6 wherein said enhancement bipolar waveform is applied at a predetermined point during said rest period.

9. The method of claim 6 wherein said rest period is a technical rest period.

10. The method of claim 6 and further comprising:

measuring a voltage level of said testing bipolar waveform applied to said battery;

measuring a current level of said testing bipolar waveform passed through said battery; and determining an impedance of said battery by dividing said voltage level of said testing bipolar waveform by said current level of said testing bipolar waveform.

11. The method of claim 6 and further comprising:

measuring a voltage level of said battery during said charge pulse;

measuring a current level passed through said battery during said charge pulse;

determining an internal resistance of said battery based on said voltage level of said battery during said charge pulse and said current level passed through said battery during said charge pulse.

12. A method for charging a battery, comprising:

applying a charge pulse to said battery;

applying an enhancement bipolar waveform to said battery during said charge pulse, said enhancement bipolar waveform having characteristics of a duration, a voltage level, a current level, a frequency, and a waveshape, wherein at least one of said characteristics is selected to enhance an ability of said battery to receive said charge pulse.

13. The method of claim 12 and further comprising the step of waiting for a rest period after said steps of applying said charge pulse and said enhancement bipolar waveform.

14. The method of claim 13 and further comprising the step of applying a discharge pulse to said battery after said steps of applying said charge pulse and said enhancement bipolar waveform and waiting for said rest period.

15. The method of claim 12 and further comprising the step of waiting for a technical rest period after said steps of applying said charge pulse and said enhancement bipolar waveform.

16. The method of claim 15 and further comprising the step of applying a discharge pulse to said battery after said steps of applying said charge pulse and said enhancement bipolar waveform and waiting for said technical rest period.

17. The method of claim 12 and further comprising the step of applying a discharge pulse to said battery after said steps of applying said charge pulse and said enhancement bipolar waveform.

18. The method of claim 12 wherein said enhancement bipolar waveform is applied at a predetermined point during said charge pulse.

19. A method for charging a battery, comprising:
applying a charge pulse to said battery;
applying an enhancement bipolar waveform to said battery during said charge pulse, said enhancement bipolar waveform having characteristics of a duration, a voltage level, a current level, a frequency, and a waveshape, wherein at least one of said characteristics is selected to enhance an ability of said battery to receive said charge pulse;
waiting for a rest period;
applying a testing bipolar waveform having a testing frequency to said battery during said rest period, said testing frequency being different from said frequency of said enhancement bipolar waveform;
measuring predetermined characteristics of said battery during said testing bipolar waveform; and
determining the state of charge of the battery based upon said predetermined characteristics which were measured during said testing bipolar waveform.

20. The method of claim 19 and further comprising:
adjusting said charge pulse in response to said step of determining the state of charge of the battery.

21. The method of claim 19 and further comprising:
measuring a voltage level of said testing bipolar waveform applied to said battery;
measuring a current level of said testing bipolar waveform passed through said battery; and
determining an impedance of said battery by dividing said voltage level of said testing bipolar waveform by said current level of said testing bipolar waveform.

22. The method of claim 19 and further comprising:
measuring a voltage level of said battery during said charge pulse;
measuring a current level passed through said battery during said charge pulse;
determining an internal resistance of said battery based on said voltage level of said battery during said charge pulse and said current level passed through said battery during said charge pulse.

23. A method for charging a battery, comprising:
applying a charge pulse to said battery;
applying an enhancement bipolar waveform to said battery during said charge pulse, said enhancement bipolar waveform having characteristics of a duration, a voltage level, a current level, a frequency, and a waveshape, wherein at least one of said characteristics is selected to enhance an ability of said battery to receive a subsequent charge pulse.

24. The method of claim 23 and further comprising the step of waiting for a rest period after said steps of applying said charge pulse and said enhancement bipolar waveform.

25. The method of claim 24 and further comprising the step of applying a discharge pulse to said battery after said steps of applying said charge pulse and said enhancement bipolar waveform and waiting for said rest period.

26. The method of claim 23 and further comprising the step of waiting for a technical rest period after said steps of applying said charge pulse and said enhancement bipolar waveform.

27. The method of claim 26 and further comprising the step of applying a discharge pulse to said battery after said steps of applying said charge pulse and said enhancement bipolar waveform and waiting for said technical rest period.

28. The method of claim 23 and further comprising the step of applying a discharge pulse to said battery after said steps of applying said charge pulse and said enhancement bipolar waveform.

29. The method of claim 23 wherein said enhancement bipolar waveform is applied at a predetermined point during said charge pulse.

30. A method for charging a battery, comprising:
applying a charge pulse to said battery;
applying an enhancement bipolar waveform to said battery during said charge pulse, said enhancement bipolar waveform having characteristics of a duration, a voltage level, a current level, a frequency, and a waveshape, wherein at least one of said characteristics is selected to enhance an ability of said battery to receive a subsequent charge pulse;
applying a rest period;
applying a testing bipolar waveform having a testing frequency to said battery during said rest period, said testing frequency being different from said frequency of said enhancement bipolar waveform;
measuring predetermined characteristics of said battery during said testing bipolar waveform; and
determining the state of charge of the battery based upon said predetermined characteristics which were measured during said testing bipolar waveform.

31. The method of claim 30 and further comprising:
adjusting said subsequent charge pulse in response to said step of determining the state of charge of the battery.

32. The method of claim 30 and further comprising:
measuring a voltage level of said testing bipolar waveform applied to said battery;
measuring a current level of said testing bipolar waveform passed through said battery; and
determining an impedance of said battery by dividing said voltage level of said testing bipolar waveform by said current level of said testing bipolar waveform.

33. The method of claim 30 and further comprising:
measuring a voltage level of said battery during said charge pulse;
measuring a current level passed through said battery during said charge pulse;

determining an internal resistance of said battery based on said voltage level of said battery during said charge pulse and said current level passed through said battery during said charge pulse.

34. A method for charging a battery, comprising:

applying a charge pulse to said battery;

applying a discharge pulse to said battery; and applying an enhancement bipolar waveform to said battery during said discharge pulse, said enhancement bipolar waveform having characteristics of a duration, a voltage level, a current level, a frequency, and a waveshape, wherein at least one of said characteristics is selected to enhance an ability of said battery to receive a subsequent charge pulse.

35. The method of claim 34 and further comprising the step of waiting for a rest period between said charge pulse and said discharge pulse.

36. The method of claim 34 and further comprising the step of waiting for a technical rest period between said charge pulse and said discharge pulse.

37. The method of claim 34 and further comprising the steps of:

waiting for a subsequent rest period after said discharge pulse;

applying a subsequent discharge pulse to said battery after said subsequent rest period;

applying a subsequent bipolar waveform to said battery during said subsequent discharge pulse.

38. The method of claim 37 wherein said enhancement bipolar waveform is applied at a predetermined point during said subsequent discharge pulse.

39. The method of claim 37 wherein said enhancement bipolar waveform is applied at a predetermined point during said discharge pulse.

40. The method of claim 34 wherein said enhancement bipolar waveform is applied at a predetermined point during said discharge pulse.

41. A method for charging a battery, comprising:

applying a charge pulse to said battery;

applying a discharge pulse to said battery; and applying an enhancement bipolar waveform to said battery during said discharge pulse, said enhancement bipolar waveform having characteristics of a duration, a voltage level, a current level, a frequency, and a waveshape, wherein at least one of said characteristics is selected to enhance an ability of said battery to receive a subsequent charge pulse;

applying a rest period;

applying a testing bipolar waveform having a testing frequency to said battery during said rest period, said testing frequency being different from said frequency of said enhancement bipolar waveform;

measuring predetermined characteristics of said battery during said testing bipolar waveform; and determining the state of charge of the battery based upon said predetermined characteristics which were measured during said testing bipolar waveform.

42. The method of claim 41 and further comprising:

adjusting at least one of said charge pulse, said discharge pulse, and said rest period, in response to said step of determining the state of charge of the battery.

43. The method of claim 41 and further comprising:

measuring a voltage level of said testing bipolar waveform applied to said battery;

measuring a current level of said testing bipolar waveform passed through said battery; and determining an impedance of said battery by dividing said voltage level of said testing bipolar waveform by said current level of said testing bipolar waveform.

44. The method of claim 41 and further comprising:

measuring a voltage level of said battery during said charge pulse;

measuring a current level passed through said battery during said charge pulse;

determining an internal resistance of said battery based on said voltage level of said battery during said charge pulse and said current level passed through said battery during said charge pulse.

45. An apparatus for charging a battery comprising:

a charging circuit for applying charge pulses to said battery;

a discharging circuit for applying discharge pulses to said battery;

a bipolar waveform circuit for applying bipolar waveforms to said battery, said bipolar waveforms having characteristics of a duration, a voltage level, a current level, a frequency, and a waveshape, and wherein at least one of said characteristics is selected to enhance an ability of said battery to receive said charge pulses; and a controller, connected to said charging circuit, said discharging circuit, and said bipolar waveform circuit, said controller causing said charging circuit to apply said charge pulses, said controller causing said discharging circuit to apply said discharge pulses, said controller causing said bipolar waveform circuit to apply said bipolar waveforms during said charge pulses.

46. An apparatus for charging a battery comprising:

a charging circuit for applying charge pulses to said battery;

a discharging circuit for applying discharge pulses to said battery;

a bipolar waveform circuit for applying an enhancement bipolar waveform and a testing bipolar waveform to said battery, said enhancement bipolar waveform having characteristics of a duration, a voltage level, a current level, a frequency, and a waveshape, and wherein at least one of said characteristics is selected to enhance an ability of said battery to receive said charge pulses, said testing bipolar waveform having a testing frequency, said testing frequency being different from said frequency of said enhanced bipolar waveform; and a controller, connected to said charging circuit, said discharging circuit, and said bipolar waveform circuit, said controller causing said charging circuit to apply said charge pulses, said controller causing said discharging circuit to apply said discharge pulses, said controller causing said charge pulses and said discharge pulses to be separated by wait periods, said controller causing said bipolar waveform circuit to apply said enhancement bipolar waveform during predetermined wait periods and to apply said testing bipolar waveform during said rest period and subsequent to said enhancement bipolar waveform, said testing frequency being different from said frequency of said enhanced bipolar waveform, said controller measuring predetermined characteristics of said battery during said testing bipolar waveform, determining the state of charge of the battery based upon said predetermined characteristics which were measured during said testing bipolar waveform, and adjusting at least one of said charge pulse, said discharge pulse, and said rest period, in response to said state of charge of the battery.

47. An apparatus for charging a battery comprising:

a charging circuit for applying charge pulses to said battery;

a discharging circuit for applying discharge pulses to said battery;

a bipolar waveform circuit for applying bipolar waveforms to said battery, said bipolar waveforms having characteristics of a duration, a voltage level, a current level, a frequency, and a waveshape, and wherein at least one of said characteristics is selected to enhance an ability of said battery to receive said charge pulses; and a controller, connected to said charging circuit, said discharging circuit, and said bipolar waveform circuit, said controller causing said charging circuit to apply said charge pulses, said controller causing said discharging circuit to apply said discharge pulses, said controller causing said bipolar waveform circuit to apply said bipolar waveforms during said discharge pulses.

48. An apparatus for charging a battery comprising:

a charging circuit for applying charge pulses to said battery;

a discharging circuit for applying discharge pulses to said battery;

a bipolar waveform circuit for applying an enhancement bipolar waveform and a testing bipolar waveform to said battery, said enhancement bipolar waveform having characteristics of a duration, a voltage level, a current level, a frequency, and a waveshape, and wherein at least one of said characteristics is selected to enhance an ability of said battery to receive said charge pulses, said testing bipolar waveform having a testing frequency, said testing frequency being different from said frequency of said enhanced bipolar waveform; and a controller, connected to said charging circuit, said discharging circuit, and said bipolar waveform circuit, said controller causing said charging circuit to apply said charge pulses, said controller causing said discharging circuit to apply said discharge pulses, said controller causing said charge pulses and said discharge pulses to be separated by wait periods, said controller causing said bipolar waveform circuit to apply said enhancement bipolar waveform during predetermined wait periods and to apply said testing bipolar waveform during a subsequent rest period, said testing frequency being different from said frequency of said enhanced bipolar waveform, said controller measuring predetermined characteristics of said battery during said testing bipolar waveform, determining the state of charge of the battery based upon said predetermined characteristics which were measured during said testing bipolar waveform, and adjusting at least one of said charge pulse, said discharge pulse, and said rest period, in response to said state of charge of the battery.

\* \* \* \* \*

UNITED STATES PATENT AND TRADEMARK OFFICE
CERTIFICATE OF CORRECTION

PATENT NO. : 6,232,750 B1  
DATED : May 15, 2001  
INVENTOR(S) : Yury Podrazhansky, Richard C. Cope, Mikhail Y. Podrazhansky Page 1 of 1

It is certified that error appears in the above-identified patent and that said Letters Patent is hereby corrected as shown below:

<u>Title page,</u>
Item [73], Assignee, should be -- Enrev Corporation --

Signed and Sealed this

Twenty-fifth Day of December, 2001

Attest:

Attesting Officer

JAMES E. ROGAN
*Director of the United States Patent and Trademark Office*